US 8,232,952 B2

(12) United States Patent
Yoshihara et al.

(10) Patent No.: US 8,232,952 B2
(45) Date of Patent: Jul. 31, 2012

(54) DISPLAY ELEMENT, METHOD OF DRIVING THE SAME, AND ELECTRONIC PAPER INCLUDING THE SAME

(75) Inventors: Toshiaki Yoshihara, Kawasaki (JP); Masaki Nose, Kawasaki (JP); Junji Tomita, Kawasaki (JP); Yoshihisa Kurosaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 643 days.

(21) Appl. No.: 12/238,028

(22) Filed: Sep. 25, 2008

(65) Prior Publication Data

US 2009/0027326 A1    Jan. 29, 2009

Related U.S. Application Data

(63) Continuation of application No. PCT/JP2006/306494, filed on Mar. 29, 2006.

(51) Int. Cl.
G09G 3/36 (2006.01)
(52) U.S. Cl. .............................. 345/100; 345/98; 345/87
(58) Field of Classification Search .................. 345/100, 345/88; 349/74, 117
See application file for complete search history.

(56) References Cited

U.S. PATENT DOCUMENTS

| | | | | |
|---|---|---|---|---|
| 5,818,615 A | * | 10/1998 | Abileah et al. ................. | 349/117 |
| 6,232,938 B1 | * | 5/2001 | Tsuchida et al. ................ | 345/88 |
| 2001/0028421 A1 | * | 10/2001 | Masazumi et al. .............. | 349/74 |
| 2001/0035851 A1 | | 11/2001 | Komatsu et al. | |
| 2004/0021616 A1 | | 2/2004 | Goto et al. | |

FOREIGN PATENT DOCUMENTS

| | | |
|---|---|---|
| JP | 10-048595 A | 2/1998 |
| JP | 11-149089 A | 6/1999 |
| JP | 2001-100176 A | 4/2001 |
| JP | 2001-281620 A | 10/2001 |
| JP | 2003-98506 A | 4/2003 |
| JP | 2003098506 A * | 4/2003 |
| JP | 2003-344827 A | 12/2003 |
| JP | 2004-13121 A | 1/2004 |
| JP | 2004-61892 A | 2/2004 |

OTHER PUBLICATIONS

International Search Report of PCT/JP2006/306494, date of mailing Jul. 4, 2006.

* cited by examiner

*Primary Examiner* — Quan-Zhen Wang
*Assistant Examiner* — Troy Dalrymple
(74) *Attorney, Agent, or Firm* — Westerman, Hattori, Daniels & Adrian, LLP

(57) ABSTRACT

The present invention provides a display element capable of allowing a user to recognize the content of an image in a short time during screen rewriting, a method of driving the same, and an electronic paper including the same. At the time of image display, B and R pixels $12b(i, 1)$ to $12b(i, 320)$ and $12r(i, 1)$ to $12r(i, 320)$ in i-th rows of B and R display units $6b$ and $6r$ and G pixels $12g(241-i, 1)$ to $12g(241-i, 320)$ in a $(241-i)$-th row of a G display unit $6g$ are driven substantially at the same time.

12 Claims, 19 Drawing Sheets

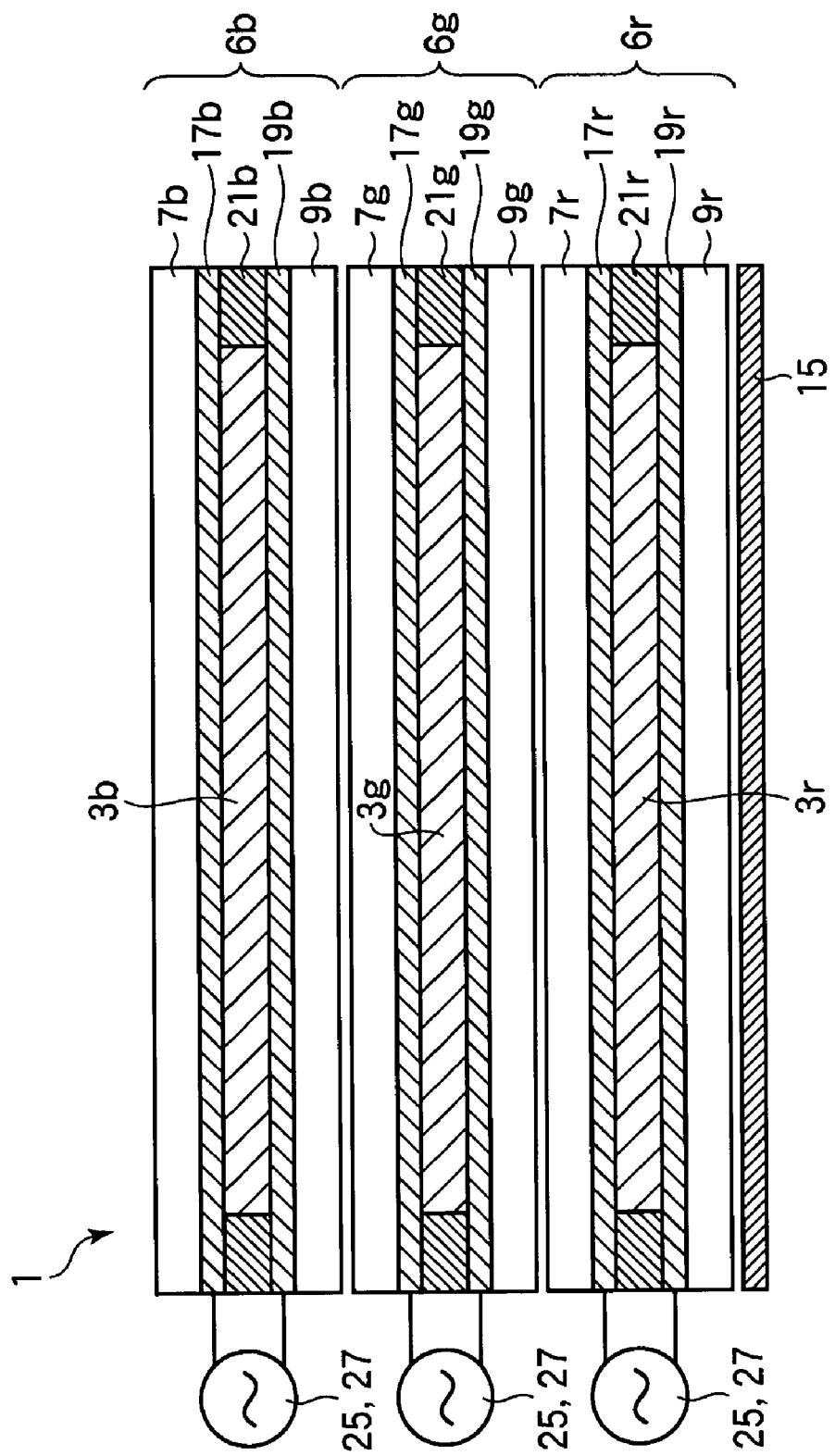

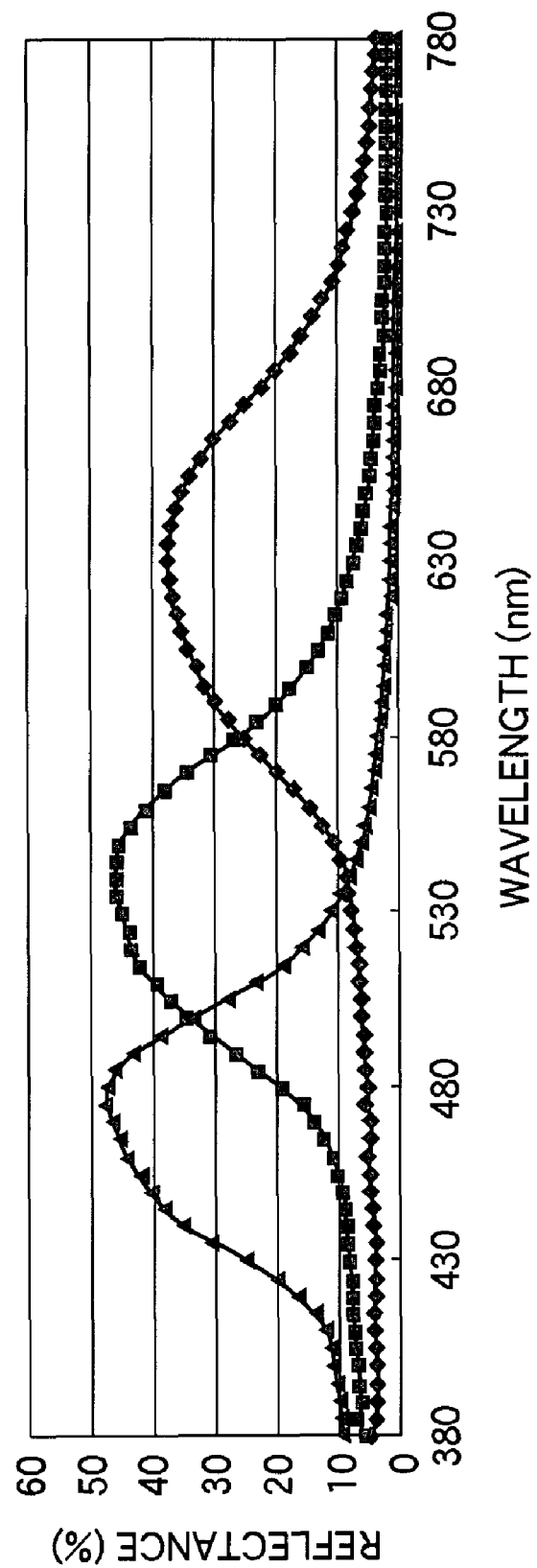

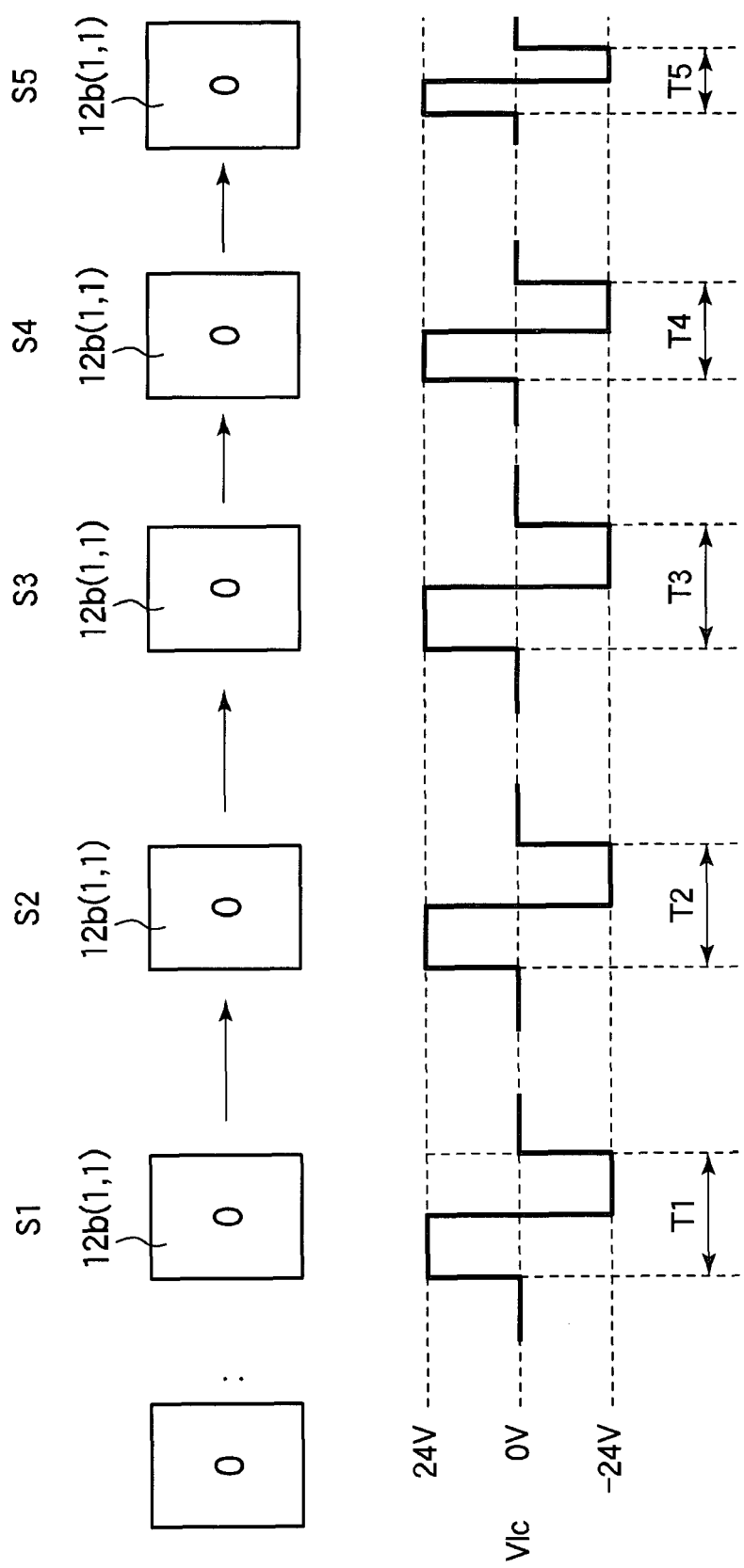

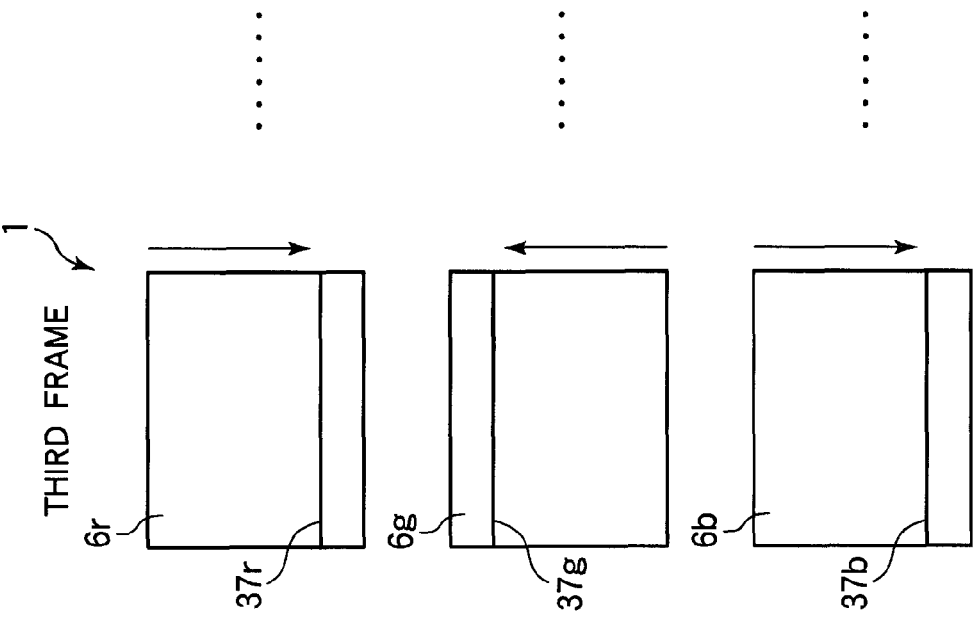
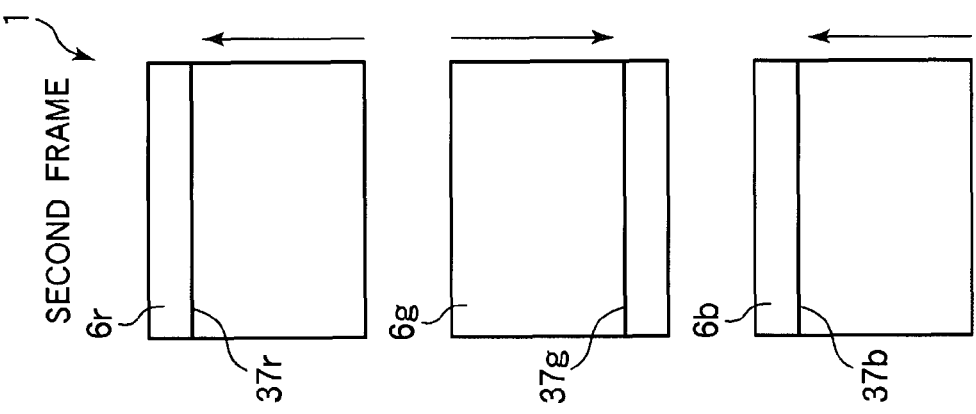
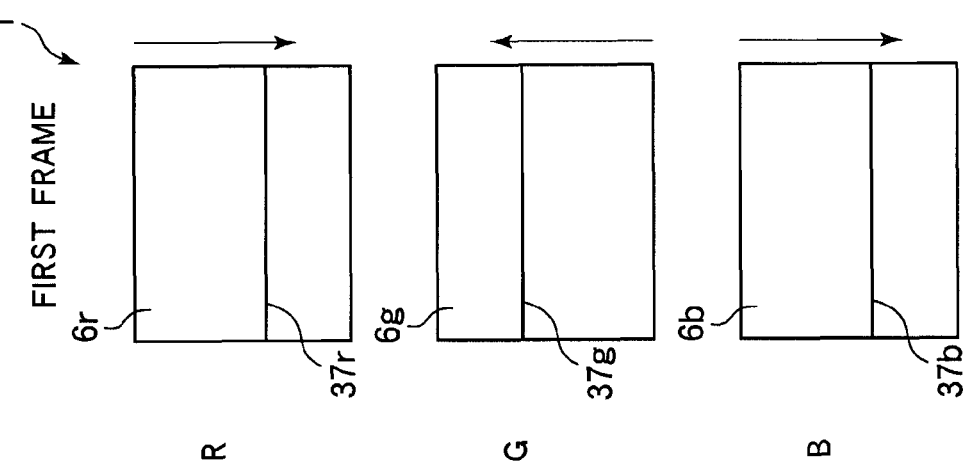

DISPLAY ELEMENT, METHOD OF DRIVING THE SAME, AND ELECTRONIC PAPER INCLUDING THE SAME

BACKGROUND

1. Field

The present invention relates to a display element having a structure in which a plurality of display units are laminated, a method of driving the same, and an electronic paper including the same.

2. Description of the Related Art

Recently, development of electronic paper is active in enterprises, universities, and etc. As markets considered to have promising applications of electronic paper, various applied portable apparatus have been proposed, including electronic books first of all, sub-displays of mobile terminal apparatus, and display parts of IC cards. As an example of a display element used for the electronic paper, there is a liquid crystal display element that uses a liquid crystal composition having a cholesteric phase formed therein (which is referred to as cholesteric liquid crystal or chiral nematic liquid crystal and hereinafter, referred to as cholesteric liquid crystal). The cholesteric liquid crystal has excellent characteristics, for example, a semipermanent display retention characteristic (memory characteristics), a vivid color display characteristic, a high-contrast characteristic, and a high-resolution characteristic.

FIG. 19 is a cross-sectional view schematically illustrating the structure of a liquid crystal display element 51 capable of performing full color display using the cholesteric liquid crystal. The liquid crystal display element 51 has a structure in which a blue (B) display unit 46b, a green (G) display unit 46g, and a red (R) display unit 46r are laminated from a display surface in this order. In FIG. 19, the outer surface of an upper substrate 47b serves as the display surface, and external light (indicated by the arrow in a solid line) is incident on the display surface from the upper side of the substrate 47b. In addition, an observer's eye and a viewing direction (indicated by the arrow in a broken line) are schematically shown above the substrate 47b.

The B display unit 46b includes a blue (B) liquid crystal layer 43b interposed between a pair of upper and lower substrates 47b and 49b, and a pulse voltage source 41b that applies a predetermined pulse voltage to the B liquid crystal layer 43b. The G display unit 46g includes a green (G) liquid crystal layer 43g interposed between a pair of upper and lower substrates 47g and 49g, and a pulse voltage source 41g that applies a predetermined pulse voltage to the G liquid crystal layer 43g. The R display unit 46r includes a red (R) liquid crystal layer 43r interposed between a pair of upper and lower substrates 47r and 49r, and a pulse voltage source 41r that applies a predetermined pulse voltage to the R liquid crystal layer 43r. A light absorbing layer 45 is provided on the rear surface of the lower substrate 49r of the R display unit 46r.

The cholesteric liquid crystal used for each of the B, G, and R liquid crystal layers 43b, 43g, and 43r is a liquid crystal mixture of nematic liquid crystal and a relatively large amount of a chiral additive, for example, several tens of percent by weight of additive (which is also called a chiral material). When a relatively large amount of chiral material is added to the nematic liquid crystal, it is possible to form a cholesteric phase having nematic liquid crystal molecules strongly twisted into a helical shape.

The cholesteric liquid crystal has bistability (memory characteristics) and is possible to be in either of a planar state, a focal conic state, or an intermediate state between the planar state and the focal conic state by adjusting the strength of an electric field applied to the liquid crystal. When the cholesteric liquid crystal is in either of the planar state, the focal conic state, or the intermediate state therebetween once, the cholesteric liquid crystal stably maintains its state even when no electric field is applied.

The planar state is obtained by applying a predetermined high voltage between the upper and lower substrates 47 and 49 to apply a strong electric field to the liquid crystal layer 43 and then rapidly reducing the electric field to zero. The focal conic state is obtained by applying, for example, a predetermined voltage that is lower than the high voltage between the upper and lower substrates 47 and 49 to apply an electric field to the liquid crystal layer 43 and then rapidly reducing the electric field to zero.

The intermediate state between the planar state and the focal conic state is obtained by applying, for example, a voltage that is lower than that used to obtain the focal conic state between the upper and lower substrates 47 and 49 to apply an electric field to the liquid crystal layer 43 and then rapidly reducing the electric field to zero.

Next, the display principle of the liquid crystal display element 51 using the cholesteric liquid crystal will be described using the B display unit 46b as an example. FIG. 20A shows the arrangement of cholesteric liquid crystal molecules 33 in the planar state in the B liquid crystal layer 43b of the B display unit 46b. As shown in FIG. 20A, the liquid crystal molecules 33 in the planar state sequentially rotate in the thickness direction of the substrates to form a helical structure, and the helical axis of the helical structure is substantially vertical to the surfaces of the substrates.

In the planar state, light having a predetermined wavelength corresponding to the helical pitch of the liquid crystal molecules 33 is selectively reflected from the liquid crystal layer. When the average refractive index of the liquid crystal layer is n and the helical pitch is p, a wavelength $\lambda$ where the highest reflectance is obtained is represented by $\lambda = n \cdot p$.

Therefore, in order to selectively reflect blue light from the B liquid crystal layer 43b of the B display unit 46b in the planar state, the average refractive index n and the helical pitch p are determined such that, for example, the wavelength $\lambda$ is 480 nm. The average refractive index n can be adjusted by selecting a liquid crystal material and a chiral material, and the helical pitch p can be adjusted by adjusting the content of the chiral material.

FIG. 20B shows the arrangement of the cholesteric liquid crystal molecules 33 in the focal conic state in the B liquid crystal layer 43b of the B display unit 46b. As shown in FIG. 20B, the liquid crystal molecules 33 in the focal conic state sequentially rotate in the in-plane direction of the substrates to form a helical structure, and the helical axis of the helical structure is substantially parallel to the surfaces of the substrates. In the focal conic state, the selectivity of the B liquid crystal layer 43b with respect to a reflection wavelength is lost, and the B liquid crystal layer 43b transmits most of incident light. The transmitted light is absorbed by the light absorbing layer 45 that is provided on the rear surface of the lower substrate 49r of the R display unit 46r whereby dark (black) display is achieved.

In the intermediate state between the planar state and the focal conic state, the ratio of the reflected light and the transmitted light is adjusted by the existential ratio of the planar state and the focal conic state, and the intensity of the reflected light varies. Therefore, it is possible to perform halftone display corresponding to the intensity of the reflected light.

As described above, it is possible to control the amount of light reflected by adjusting the alignment state of the cholesteric liquid crystal molecules 33 twisted in the helical shape. Similar to the B liquid crystal layer 43b described above, the cholesteric liquid crystal that selectively reflects green and red light in the planar state is sealed into the G liquid crystal layer 43g and the R liquid crystal layer 43r to manufacture the liquid crystal display element 51 capable of performing full color display. The liquid crystal display element 51 has memory characteristics and can perform full color display without consuming power except screen rewriting.
Patent Document 1: JP-A-10-48595

In general, it is preferable that the display element rewrites images in a short time. However, the time required for the liquid crystal display element using the cholesteric liquid crystal to perform data write scanning for screen rewriting is 10 to 100 times longer than that in a liquid crystal display element according to the related art using twisted nematic (TN) liquid crystal or super twisted nematic (STN) liquid crystal. Therefore, about 0.5 to 10 seconds are required to perform screen rewriting, and it takes a long time for an observer to recognize the content of the image displayed on the screen.

SUMMARY OF THE INVENTION

According to one aspect of the invention, there is a display element including: a first display unit that includes a plurality of first pixels; a second display unit that is laminated on the first display unit and includes a plurality of second pixels which are arranged so as to correspond to the plurality of first pixels; and a driving unit that drives predetermined pixels of the plurality of first pixels and predetermined second pixels other than the second pixels corresponding to the predetermined first pixels during image display substantially at the same time.

BRIEF DESCRIPTION OF THE DRAWINGS

FIG. 2 is a cross-sectional view schematically illustrating the structure of the liquid crystal display element 1 according to the first embodiment;

FIG. 3 is a diagram illustrating an example of the reflection spectrum of the liquid crystal display element in a planar state;

FIG. 15 is a diagram illustrating a process of displaying level 0 (black) in the multi-tone display method according to the second embodiment;

FIGS. 16A to 16C are diagrams illustrating the state of a screen on which one frame of image is being displayed by line sequential scanning of a liquid crystal display element 1 according to the second embodiment;

DESCRIPTION OF THE PREFERRED EMBODIMENTS

First Embodiment

Figure 1:
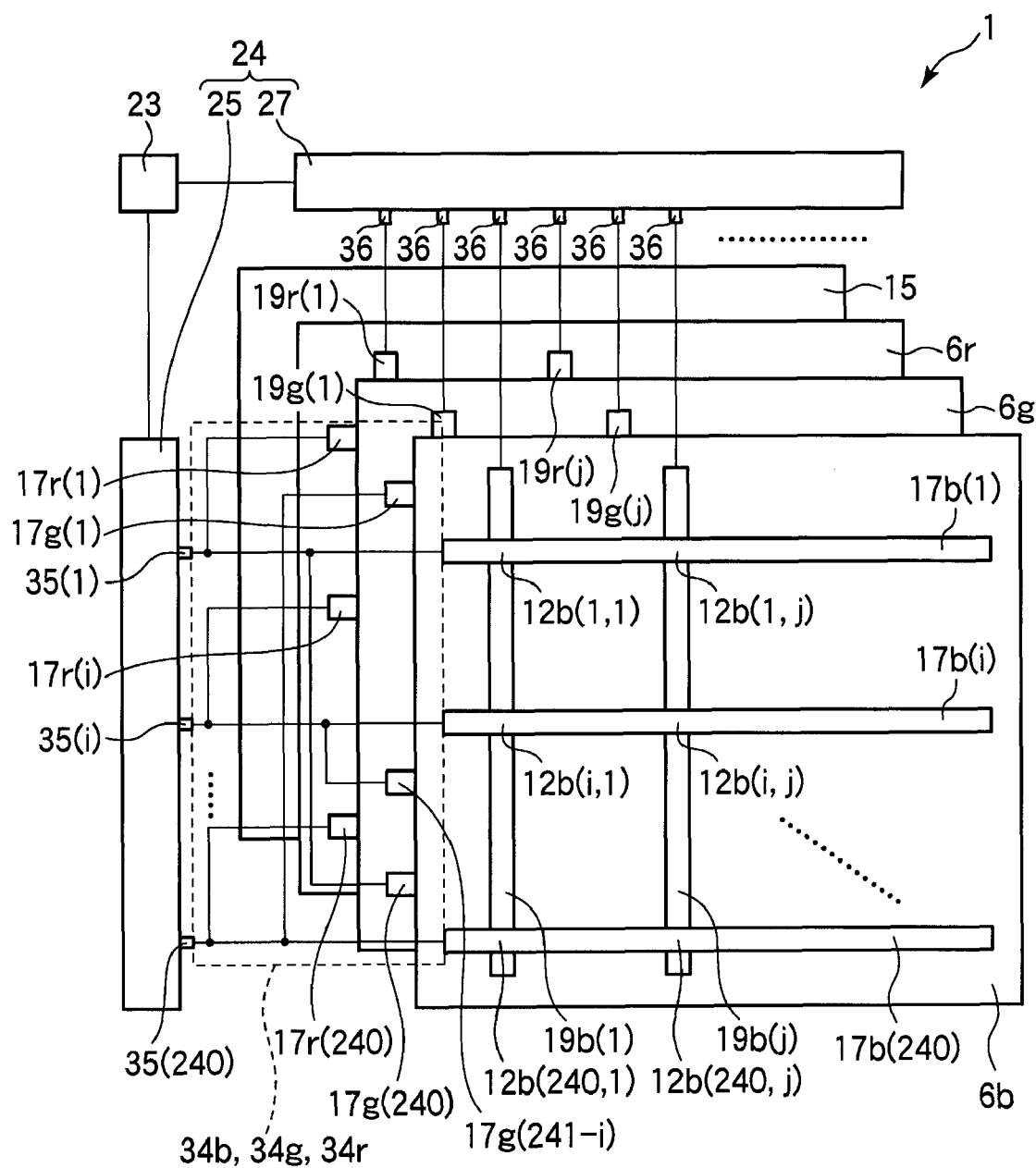
FIG. 1 is a diagram schematically illustrating the structure of a liquid crystal display element 1 according to a first embodiment.

A display element, a method of driving the same, and an electronic paper including the same according to a first embodiment will be described with reference to FIGS. 1 to 6. In this embodiment, a liquid crystal display element 1 using blue (B), green (G), and red (R) cholesteric liquid crystals is used as an example of a display element. FIG. 1 is a diagram schematically illustrating an example of the structure of the liquid crystal display element 1 according to this embodiment. FIG. 2 is a cross-sectional view schematically illustrating the structure of the liquid crystal display element 1 taken along a line that is parallel to the horizontal direction of FIG. 1.

As shown in FIGS. 1 and 2, the liquid crystal display element 1 include a B display unit (first display unit) 6b having a B liquid crystal layer 3b that reflects blue light in a planar state, a G display unit (second display unit) 6g having a G liquid crystal layer 3g that reflects green light in a planar state, and an R display unit (third display unit) 6r having an R liquid crystal layer 3r that reflects red light in a planar state. The B, G, and R display units 6b, 6g, and 6r are laminated in this order on a light incident surface (display surface).

The B display unit 6b includes a pair of upper and lower substrates 7b and 9b opposite to each other and the B liquid crystal layer 3b that is sealed between the two substrates 7b and 9b. The B liquid crystal layer 3b includes B cholesteric liquid crystal having an average refractive index n and a helical pitch p that are adjusted so as to selectively reflect blue light.

The G display unit 6g includes a pair of upper and lower substrates 7g and 9g opposite to each other and the G liquid crystal layer 3g that is sealed between the two substrates 7g and 9g. The G liquid crystal layer 3g includes G cholesteric liquid crystal having an average refractive index n and a helical pitch p that are adjusted so as to selectively reflect green light.

The R display unit 6r includes a pair of upper and lower substrates 7r and 9r opposite to each other and the R liquid crystal layer 3r that is sealed between the two substrates 7r and 9r. The R liquid crystal layer 3r includes R cholesteric liquid crystal having an average refractive index n and a helical pitch p that are adjusted so as to selectively reflect red light.

A liquid crystal composition forming the B, G, and R liquid crystal layers 3b, 3g, and 3r is cholesteric liquid crystal obtained by adding 10 to 40 wt % of chiral material to a nematic liquid crystal mixture. The content of the chiral material added is represented by a value when the sum of the amount of nematic liquid crystal component and the amount of chiral material is 100 wt %. Various kinds of known liquid crystal materials may be used as the nematic liquid crystal. However, it is preferable to use nematic liquid crystal having dielectric anisotropy $\Delta\epsilon$ in a range of $20 \leq \Delta\epsilon \leq 50$ in order to relatively reduce a driving voltage for the liquid crystal layers 3b, 3g, and 3r. In addition, the refractive index anisotropy $\Delta n$ of the cholesteric liquid crystal is preferably in a range of $0.18 \leq \Delta n \leq 0.24$. When the refractive index anisotropy $\Delta n$ is smaller than the above-mentioned range, the reflectances of the liquid crystal layers 3b, 3g, and 3r in the planar state are lowered. On the other hand, in the case in which the refractive index anisotropy $\Delta n$ is larger than the above-mentioned range, as the scatter reflections of the liquid crystal layers 3b, 3g, and 3r in a focal conic state increase, the viscosities of the liquid crystal layers 3b, 3g, and 3r increase, which results in a low response speed.

The chiral material added to the B and R cholesteric liquid crystals and the chiral material added to the G cholesteric liquid crystal are optical isomers having different optical rotatory powers. Therefore, the B and R cholesteric liquid crystals have the same optical rotatory power, but the optical rotatory powers of the B and R cholesteric liquid crystal are different from that of the G cholesteric liquid crystal.

FIG. 3 is a diagram illustrating an example of a reflectance spectrum of each of the liquid crystal layers 3b, 3g, and 3r in the planar state. In FIG. 3, the horizontal axis indicates the wavelength (nm) of reflected light, and the vertical axis indicates reflectance (with respect to a white plate; %). The reflectance spectrum of the B liquid crystal layer 3b is represented by a curved line linking symbols ▲ in FIG. 3. Similarly, the reflectance spectrum of the G liquid crystal layer 3g is represented by a curved line linking symbols ■ in FIG. 3, and the reflectance spectrum of the R liquid crystal layer 3r is represented by a curved line linking symbols ◆ in FIG. 3.

As shown in FIG. 3, in the reflectance spectrums of the liquid crystal layers 3b, 3g, and 3r in the planar state, the liquid crystal layer 3r has the longest center wavelength, followed by the liquid crystal layers 3g and 3b. In the laminated structure of the B, G, and R display units 6b, 6g, and 6r, the optical rotatory power of the G liquid crystal layer 3g is different from the optical rotatory powers of the B and R liquid crystal layers 3b and 3r in the planar state. Therefore, in an overlap region between blue light and green light and an overlap region between green light and red light in the reflectance spectrum shown in FIG. 3, for example, the B liquid crystal layer 3b and the R liquid crystal layer 3r can reflect right circularly polarized light, and the G liquid crystal layer 3g can reflect left circularly polarized light. In this way, it is possible to reduce the loss of reflected light and thus improve the brightness of a display screen of the liquid crystal display element 1.

The upper substrates 7b, 7g, and 7r and the lower substrates 9b, 9g, and 9r need to be transmissive. In this embodiment, two polycarbonate (PC) film substrates each having a size of 10 (cm)×8 (cm) are used. Instead of the PC substrates, glass substrates or polyethylene terephthalate (PET) film substrates may be used. These film substrates have sufficient flexibility. In this embodiment, all of the upper substrates 7b, 7g, and 7r and the lower substrates 9b, 9g, and 9r can transmit light. However, the lower substrate 9r of the R display unit 6r, which is arranged at the lowermost layer, may not transmit light.

As shown in FIGS. 1 and 2, a plurality of strip-shaped data electrodes 19b are formed in parallel to each other on one surface of the lower substrate 9b of the B display unit 6b facing the B liquid crystal layer 3b so as to extend in the vertical direction of FIG. 1. In addition, in FIG. 2, reference numeral 19b denotes a region in which the plurality of data electrodes 19b are arranged. Further, a plurality of strip-shaped scanning electrodes (first scanning lines) 17b are formed in parallel to each other on one surface of the upper substrate 7b facing the B liquid crystal layer 3b so as to extend in the horizontal direction of FIG. 1. As shown in FIG. 1, the plurality of scanning electrodes 17b and the plurality of data electrode 19b are opposite to each other such that they intersect each other, as viewing the upper and lower substrates 7b and 9b in the normal direction of the electrode-formed surface. In this embodiment, in order to support the QVGA resolution of 320×240 dots, transparent electrodes are patterned to form 240 strip-shaped scanning electrodes 17b(i) (where i is an integer satisfying $1 \leq i \leq m = 240$) and strip-shaped 320 data electrodes 19b(j) (where j is an integer satisfying $1 \leq j \leq n = 320$) at a pitch of 0.24 mm. Intersections of the electrodes 17b(i) and the electrodes 19b(j) serve as B pixels (first pixels) 12b(i, j). A plurality of B pixels 12b(i, j) are arranged in a matrix of 240 (=m) rows×320 (=n) columns.

Similar to the B display unit 6b, the G display unit 6g is provided with 240 scanning electrodes (second scanning lines) 17g(i), 320 data electrodes 19g(j), and G pixels (second pixels) 12g(i, j) (not shown) that are arranged in a matrix of m rows by n columns. Similarly, the R display unit 6r is provided with scanning electrodes 17r(i), data electrodes 19r(j), and R pixels (third pixels) 12r(i, j) (not shown).

The scanning electrodes 17b(i), 17g(i), and 17r(i) of the display units 6b, 6g, and 6r are arranged substantially at the same position so as to overlap each other, as viewed from the normal direction of the upper substrates 7b. Similarly, the data electrodes 19b(j), 19g(j), and 19r(j) are arranged substantially at the same position so as to overlap each other, as viewed from the normal direction of the upper substrates 7b.

Therefore, the B pixel 12b(i, j), the G pixel 12g(i, j), and the R pixel 12r(i, j) that are arranged in an i-th row and a j-th column of the display units 6b, 6g, and 6r are arranged substantially at the same position so as to overlap each other, as viewed from the normal direction of the upper substrate 7b. A set of the B, G, and R pixels 12b(i, j), 12g(i, j), and 12r(i, j) forms one pixel 12(i, j) of the liquid crystal display element 1. The pixels 12(i, j) are arranged in a matrix to form a display screen.

The scanning electrodes 17b, 17g, and 17r and the data electrodes 19b, 19g, and 19r are typically made of, for example, an indium tin oxide (ITO). These electrodes may be made of a transparent conductive material, such as an indium zinc oxide (IZO), amorphous silicon, or bismuth silicon oxide (BSO), or a metallic material, such as aluminum or silicon.

A scanning electrode driving circuit 25 mounting a scanning electrode driver IC for driving a plurality of scanning electrodes 17b(1) to 17b(240), 17g(1) to 17g(240), and 17r(1) to 17r(240) is connected to the upper substrates 7b, 7g, and 7r. In addition, a data electrode driving circuit 27 mounting a data electrode driver IC for driving a plurality of data electrodes 19b(1) to 19b(320), 19g(1) to 19g(320), and 19r(1) to 19r(320) is connected to the lower substrates 9b, 9g, and 9r. The scanning electrode driving circuit 25 and the data electrode driving circuit 27 form a driving unit 24.

The scanning electrode driving circuit 25 selects one scanning electrode 17b(ib) from the scanning electrodes 17b(1) to 17b(240), one scanning electrode 17g(ig) from the scanning electrodes 17g(1) to 17g(240), and one scanning electrode 17r(ir) from the scanning electrodes 17r(1) to 17r(240), on the basis of predetermined signals output from the control circuit 23, and simultaneously outputs scanning signals to the selected three scanning electrodes 17b(ib), 17g(ig), and 17r(ir).

Meanwhile, the data electrode driving circuit 27 outputs image data signals corresponding to the B pixels 12b(ib, 1) to 12b(ib, 320) on the selected scanning electrode 17b(ib) to the data electrodes 19b(1) to 19b(320), on the basis of predetermined signals output from the control circuit 23. In addition, the data electrode driving circuit 27 outputs image data signals corresponding to the G pixels 12g(ig, 1) to 12g(ig, 320) on the selected scanning electrode 17g(ig) to the data electrodes 19g(1) to 19g(320) in synchronization with the output of the image data signals to the data electrodes 19b(1) to 19b(320). Similarly, the data electrode driving circuit 27 outputs image data signals corresponding to the R pixels 12r(ir, 1) to 12r(ir, 320) on the selected scanning electrode 17r(ir) to the data electrodes 19r(1) to 19r(320) in synchronization with the output of the image data signals to the data electrodes 19b(1) to 19b(320).

For example, general-purpose STN driver ICs having a TCP (tape carrier package) structure are used as the scanning electrode driver IC and the data electrode driver IC. The scanning electrode driving circuit 25 is provided with 240 scanning electrode output terminals 35(i) (where i is an integer satisfying $1 \leq i \leq m=240$) that are equal to the number of scanning electrodes 17b (or the scanning electrodes 17g or 17r).

In this embodiment, driving voltages for the B, G, and R liquid crystal layers 3b, 3g, and 3r are substantially equal to each other. Therefore, the scanning electrodes 17b(ib), 17g(ig), and 17r(ir) are commonly connected to one output terminal 35(io). In this way, it is not necessary to provide the scanning electrode driving circuit 25 for each of the B, G, and R display units 6b, 6g, and 6r, and thus it is possible to simplify the structure of a driving circuit of the liquid crystal display element 1. In addition, it is possible to reduce the number of scanning electrode driver ICs and thus reduce the manufacturing costs of the liquid crystal display element 1. The B, G, and R scanning electrodes may be connected to a common output terminal 35 of the scanning electrode driving circuit 25, if necessary.

The data electrode driving circuit 27 has output terminals 36 whose number is equal to the sum of the data electrodes 19b, 19g, and 19r. The data electrodes 19b, 19g, and 19r are individually connected to predetermined output terminals 36 of the data electrode driving circuit 27.

In the scanning electrode driving circuit 25 according to this embodiment, the connection relationship between a predetermined output terminal 35(io) and the scanning electrodes 17b(ib), 17g(ig), and 17r(ir) that are commonly connected to the output terminal 35(io) satisfies io=ib=ir and ig=241−ib. That is, as shown in FIG. 1, the scanning electrodes 17b(1) and 17r(1) that are arranged on the upper sides in the B and R display units 6b and 6r in FIG. 1 and the scanning electrode 17g(240) that is arranged on the lower side in the G display unit 6g in FIG. 1 are commonly connected to an output terminal 35(1) that is arranged on the upper side in the scanning electrode driving circuit 25. In this way, i-th scanning electrodes 17b(i) and 17r(i) of the B and R display units 6b and 6r from the upper side and a (241−i)-th scanning electrode 17g(241−i) of the G display unit 6g are commonly connected to an i-th output terminal 35(i) of the scanning electrode driving circuit 25 from the upper side.

In this structure, generally, when the number of scanning electrodes 17b, 17g, and 17r is m, i-th scanning electrodes 17b(i) and 17r(i) of the B and R display units 6b and 6r and an (m+1−i)-th scanning electrode 17g(m+1−i) of the G display unit 6g are commonly connected to an i-th output terminal 35(i) of the scanning electrode driving circuit 25.

Each of the scanning electrodes 17b(i) are respectively connected to each of a plurality of wiring lines (not shown) provided in a flexible cable 34b, so that they are respectively electrically connected to one of the output terminals 35(i) of the scanning electrode driving circuit 25 through the flexible cable 34b.

Similarly, each of the scanning electrodes 17r(i) are respectively connected to one of a plurality of wiring lines (not shown) provided in a flexible cable 34r, so that they are respectively electrically connected to each of the output terminals 35(i) of the scanning electrode driving circuit 25 through the flexible cable 34r.

Each of the scanning electrodes 17g(i) are respectively connected to one of a plurality of wiring lines (not shown) provided in a flexible cable 34g, so that they are respectively electrically connected to each of the output terminals 35(241−i) of the scanning electrode driving circuit 25 through the flexible cable 34g.

As such, the scanning electrodes 17b(i) and 17r(i) of the B and R display units 6b and 6r are connected to the output terminal 35(i), in contrast, the scanning electrode 17g(i) of the G display unit 6g needs to be connected to the output terminal 35(241−i). For example, when a straight cable having a so-called straight wiring structure in which wiring lines in a cable extend straight without intersecting (crossing) each other is used, the flexible cable 34g for the G display unit 6g may be twisted 180° with respect to the flexible cables 34b and 34r for the B and R display units 6b and 6r, and the cables may connect the corresponding terminals. In this way, it is possible to easily connect all the scanning electrodes 17b(i), 17g(241−i), and 17r(i) to the output terminals 35(i). Each of the terminals of the flexible cables 34b, 34g, and 34r are respectively connected to the output terminals 35 of the scanning electrode driving circuit 25 and the scanning electrodes 17b, 17g, and 17r by thermal compression bonding.

Since each of the flexible cables 34b, 34g, and 34r are formed of, for example, films (thin films) and have sufficient flexibility, the liquid crystal display element 1 as a whole has also sufficient flexibility.

It is preferable that an insulating film (not shown) or an alignment film (not shown) that controls the alignment of liquid crystal molecules as a functional film is formed on each of the two electrodes 17b and 19b. The insulating film prevents a short circuit between the electrodes 17b and 19b, and serves as a gas barrier layer to improve the reliability of the liquid crystal display element 1. In addition, the alignment film may be made of an organic material, such as polyimide resin, polyamid-imide resin, polyetherimide resin, polyvinyl-butiral resin, or acrylic resin, or an inorganic material, such as silicon oxide or aluminum oxide. In this embodiment, for example, alignment films are formed (coated) on the entire surfaces of the substrates on the electrodes 17b and 19b. The alignment films may also serve as the insulating thin films.

As shown in FIG. 2, the B liquid crystal layer 3b is sealed between the two substrates 7b and 9b by a sealing material 21b that is applied onto the edges of the upper and lower substrates 7b and 9b. In addition, it is necessary to maintain the thickness (cell gap) of the B liquid crystal layer 3b to be uniform. In order to maintain a predetermined cell gap, a plurality of spherical spacers formed of resin or an inorganic oxide are dispersed in the B liquid crystal layer 3b, or a plurality of pillar spacers are formed in the B liquid crystal layer 3b. In the liquid crystal display element 1 according to this embodiment, spacers (not shown) are inserted into the B liquid crystal layer 3b to maintain a uniform cell gap. The cell gap d of the B liquid crystal layer 3b is preferably set to satisfy $3~\mu m \leqq d \leqq 6~\mu m$. If the cell gap is smaller than this range, the reflectance of the liquid crystal layer 3b in the planar state is lowered. If the cell gap is larger than this range, a high driving voltage increases.

Since the G display unit 6g and the R display unit 6r have the same structure as the B display unit 6b, a description thereof will be omitted. A visible light absorbing layer 15 is provided on the outer surface (rear surface) of the lower substrate 9r of the R display unit 6r. The visible light absorbing layer 15 can effectively absorb light unreflected from the B, G, and R liquid crystal layers 3b, 3g, and 3r. Therefore, the liquid crystal display element 1 can display an image with a high contrast ratio. The visible light absorbing layer 15 may be optionally provided.

Figure 4A:
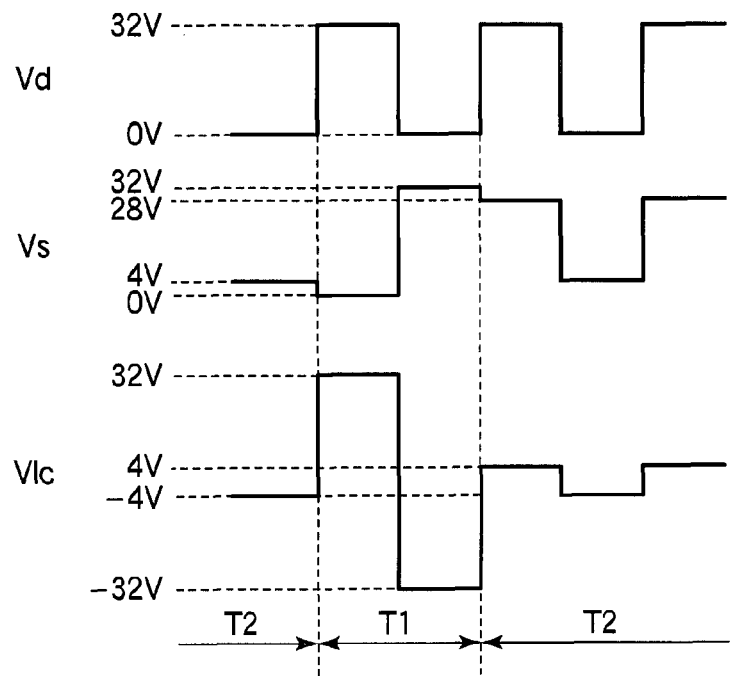
FIGS. 4A and 4B are diagrams illustrating examples of the driving waveforms of the liquid crystal display element 1 according to the first embodiment.
Figure 4B:
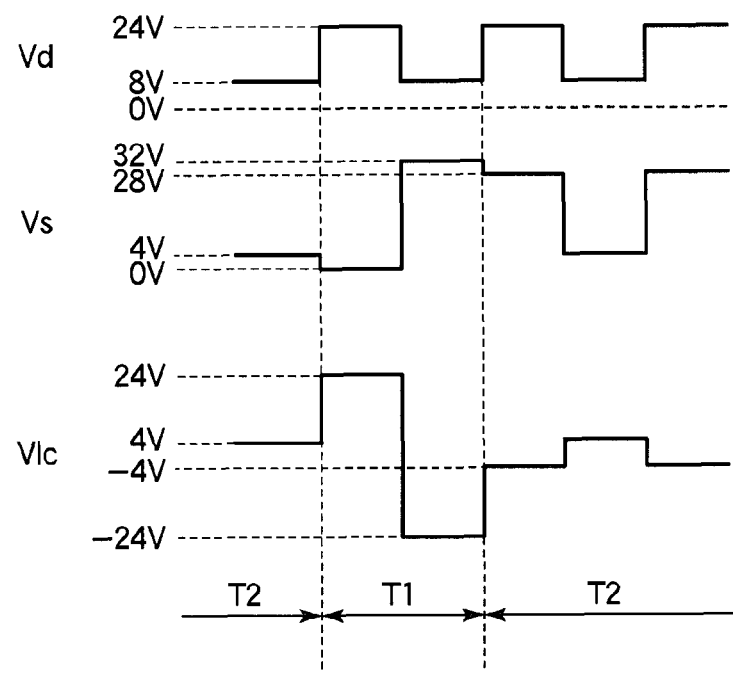

Next, a method of driving the liquid crystal display element 1 will be described with reference to FIGS. 4A to 6. FIGS. 4A and 4B are diagrams illustrating examples of driving waveforms of the liquid crystal display element 1. FIG. 4A shows a driving waveform for changing the cholesteric liquid crystal to a planar state, and FIG. 4B shows a driving waveform for changing the cholesteric liquid crystal to a focal conic state. In FIGS. 4A and 4B, an upper part shows a data signal voltage waveform Vd that is output from the data electrode driving circuit 27, a middle part shows a scanning signal voltage waveform Vs that is output from the scanning electrode driving circuit 25, and a lower part shows a voltage waveform Vlc that is applied to the pixels 12b, 12g, and 12r of the B, G, and R liquid crystal layers 3b, 3g, and 3r. In addition, in FIGS. 4A and 4B, the horizontal direction indicates the time elapsed from the left to the right, and the vertical direction indicates a voltage.

Figure 5:
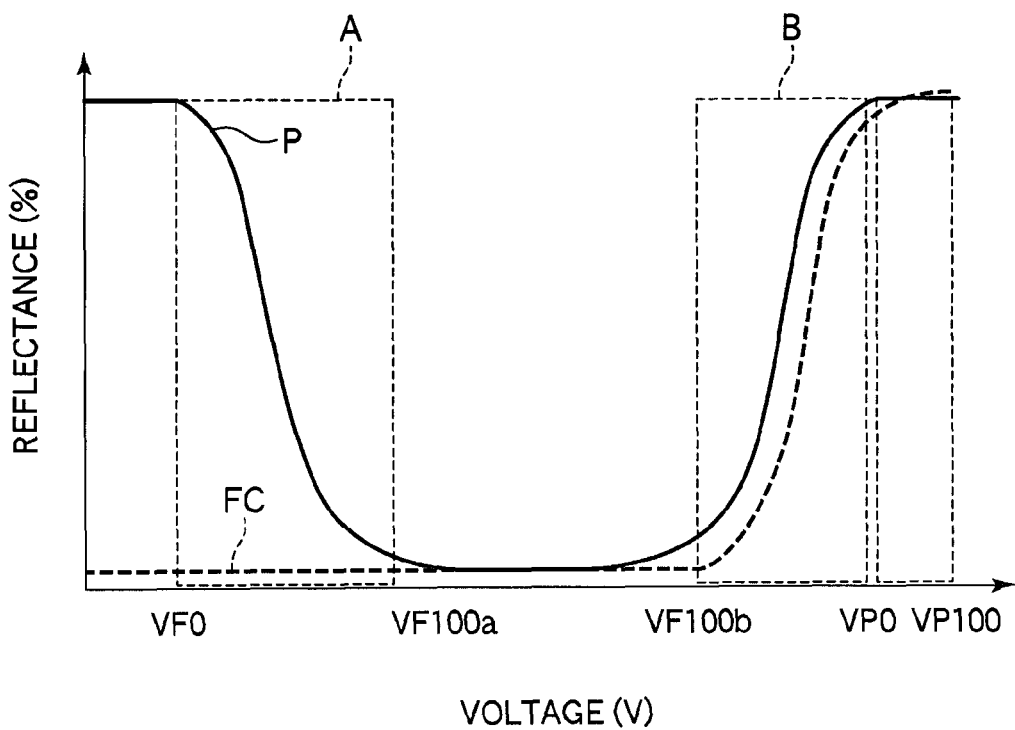
FIG. 5 is a diagram illustrating an example of a voltage-reflectance characteristic of cholesteric liquid crystal.

FIG. 5 is a diagram illustrating an example of the voltage-reflectance characteristic of the cholesteric liquid crystal. In FIG. 5, the horizontal axis indicates a voltage (V) applied to the cholesteric liquid crystal, and the vertical axis indicates the reflectance (%) of the cholesteric liquid crystal. In FIG. 5, a solid curved line P indicates the voltage-reflectance characteristic of the cholesteric liquid crystal whose initial state is a planar state, and a dotted curved line FC indicates the voltage-reflectance characteristic of the cholesteric liquid crystal whose initial state is a focal conic state.

Here, an example in which a predetermined voltage is applied to a blue (B) pixel 12b(1, 1) arranged at an intersection of the first data electrode 19b(1) and the first scanning electrode 17b(1) of the B display unit 6b shown in FIG. 1 will be described. As shown in FIG. 4A, in the first half period of the selection period T1 for which the first scanning electrode 17b(1) is selected, a data signal voltage Vd becomes +32 V and a scanning signal voltage Vs becomes 0 V. In the second half period of the selection period, the data signal voltage Vd becomes 0 V and the scanning signal voltage becomes +32 V. Therefore, a pulse voltage of ±32 V is applied to the B liquid crystal layer 3b of the B pixel 12b(1, 1) during the selection period T1. As shown in FIG. 5, when a predetermined high voltage VP100 (for example, 32 V) is applied to the cholesteric liquid crystal to generate a strong electric field, the liquid crystal molecules having a helical structure are completely untwisted, and all the liquid crystal molecules are arranged in a homeotropic state along the direction of the electric field. Therefore, the liquid crystal molecules in the B liquid crystal layer 3b of the B pixel 12b(1, 1) are in the homeotropic state during the selection period T1.

During a non-selection period T2 after the selection period T1, a voltage of, for example, +28 V or +4 V is applied to the first scanning electrode 17b(1) at a cycle corresponding to half the selection period T1. Meanwhile, a predetermined data signal voltage Vd is applied to the first data electrode 19b(1). In FIG. 4A, a voltage of, for example, +32 V or 0 V is applied to the first data electrode 19b(1) at a cycle corresponding to half the selection period T1. Therefore, a pulse voltage of ±4 V is applied to the B liquid crystal layer 3b of the B pixel 12b(1, 1) during the non-selection period T2. In this way, the electric field generated in the B liquid crystal layer 3b of the B pixel 12b(1, 1) during the non-selection period T2 becomes approximately zero.

When the voltage applied to the liquid crystal molecules in the homeotropic state is changed from VP100 (±32 V) to VF0 (±4 V) and the electric field is sharply reduced to approximately zero, the liquid crystal molecules are helically twisted such that their helical axes are aligned with a direction that is substantially vertical to the two electrodes 17b(1) and 19b(1), and turn to the helical state, which is the planar state that selectively reflects light corresponding to a helical pitch. Therefore, the B liquid crystal layer 3b of the B pixel 12b(1, 1) turns to the planar state to reflect light. As a result, the B pixel 12b(1, 1) displays blue.

Meanwhile, as shown in FIG. 4B, about in the first half period and the second half period of the selection period T1, the data signal voltage Vd becomes 24 V/8 V and the scanning signal voltage Vs becomes 0 V/+32 V. Then, a pulse voltage of ±24 V is applied to the B liquid crystal layer 3b of the B pixel 12b(1, 1). As shown in FIG. 5, when a predetermined low voltage VF100b (for example, 24 V) is applied to the cholesteric liquid crystal to generate a weak electric field, the liquid crystal molecules having a helical structure are not completely untwisted. During the non-selection period T2, a voltage of, for example, +28 V/+4 V is applied to the first scanning electrode 17b(1) at a cycle corresponding to half the selection period T1, and a predetermined data signal voltage Vd (for example, +24 V/8 V) is applied to the data electrode 19b(1) at a cycle corresponding to half the selection period T1. Therefore, a pulse voltage of −4 V/+4 V is applied to the B liquid crystal layer 3b of the B pixel 12b(1, 1) during the non-selection period T2. In this way, the electric field generated in the B liquid crystal layer 3b of the B pixel 12b(1, 1) during the non-selection period T2 becomes approximately zero.

In the state in which the liquid crystal molecules having the helical structure are not completely untwisted, when the voltage applied to the cholesteric liquid crystal is changed from VF100b (±24 V) to VF0 (±4 V) and the electric field is rapidly reduced to approximately zero, the liquid crystal molecules are helically twisted such that their helical axes are aligned with a direction that is substantially parallel to the two electrodes 17b(1) and 19b(1), and turn to the focal conic state that transmits incident light. Therefore, the B liquid crystal layer 3b of the B pixel 12b(1, 1) becomes the focal conic state and transmits light. As shown in FIG. 5, even when a voltage of VP100 (V) is applied to generate a strong electric field in the liquid crystal layer and then the electric field is slowly removed, it is possible to maintain the cholesteric liquid crystal in the focal conic state.

The driving voltage and the driving method are just examples. When a pulse voltage of 30 to 35 V is applied between the two electrodes 17b(1) and 19b(1) at room temperature for an effective time of 20 ms, the cholesteric liquid crystal of the B liquid crystal layer 3b becomes a selectively reflecting state (planar state). When a pulse voltage of 15 to 22 V is applied for an effective time of 20 ms, the cholesteric liquid crystal becomes a high transmission state (focal conic state).

When a pulse voltage (±22 V to ±30 V) in the range that is represented by a dotted rectangle B in FIG. 5 is applied between the two electrodes 17b(1) and 19b(1) at room temperature for an effective time 20 ms and then a pulse voltage of ±4 V is applied to rapidly reduce the electric field generated between the two electrodes 17b(1) and 19b(1) to approximately zero, the cholesteric liquid crystal of the B liquid crystal layer 3b becomes an intermediate state between the planar state and the focal conic state. In this state, the B pixel 12b(1, 1) displays a halftone.

In the case in which the initial state of the liquid crystal layer 3b of the B pixel 12b(1,1) is a planar state, even when a pulse voltage (±4 V to ±15 V) in the range that is represented by a dotted rectangle A in FIG. 5 is applied between the two electrodes 17b(1) and 19b(1) at room temperature for an effective time 20 ms and then a pulse voltage of ±4 V is applied to rapidly reduce the electric field generated between the two electrodes 17b(1) and 19b(1) to approximately zero, the cholesteric liquid crystal of the B liquid crystal layer 3b becomes an intermediate state between the planar state and the focal conic state, and the B pixel 12b(1, 1) displays a halftone.

A green (G) pixel 12g(1, 1) and a red (R) pixel 12r(1, 1) are driven by the same method as that driving the B pixel 12b(1, 1) to display a color image on the pixel 12(1, 1), which is a laminate of the three B, G, and R pixels 12b(1, 1), 12g(1, 1), and 12r(1, 1). In addition, the first to two hundred fortieth scanning electrodes 17b(1) to 17b(240), 17g(1) to 17g(240), and 17r(1) to 17r(240) are driven by so-called line sequential driving (line sequential scanning) to rewrite a data voltage to each of the data electrodes 19b, 19g, and 19r, thereby outputting display data to all the pixels from the pixel 12(1, 1) to the pixel 12(240, 320). In this way, it is possible to perform color display corresponding to one frame (display screen).

As described above, the connection relationship between a predetermined output terminal 35(io) of the scanning electrode driving circuit 25 and the scanning electrodes 17b(ib), 17g(ig), and 17r(ir) that are commonly connected to the output terminal 35(io) satisfies io=ib=ir and ig=241−ib. Therefore, in the method of driving the liquid crystal display element 1 according to this embodiment, at a point of time during image display, G pixels 12g(241−i, 1) to 12g(241−i, 320) in a (241−i)-th row of the G display unit are driven substantially at the same time when B and R pixels 12b(i, 1) to 12b(i, 320) and 12r(i, 1) to 12r(i, 320) in i-th rows of the B and R display units 6b and 6r are driven. That is, in the B and R display units 6b and 6r and the G display unit 6g, the line sequential scanning is performed at different scanning start positions and in the opposite direction.

When scanning starts, the first scanning electrodes 17b(1) and 17r(1) of the B and R display units 6b and 6r and the 240-th scanning electrode 17g(240) of the G display unit 6g are simultaneously selected and the scanning signal voltage Vs is applied to the scanning electrodes. At the same time, the data electrode driving circuit 27 applies the data signal voltages Vd corresponding to the B, G, and R pixels 12b(1, 1) to 12b(1, 320), 12g(240, 1) to 12g(240, 320), and 12r(1, 1) to 12r(1, 320) that are formed on the scanning electrodes 17b(1), 17g(240), and 17r(1) to the data electrodes 19b(1) to 19b(320), 19g(1) to 19g(320), and 19r(1) to 19r(320), respectively. Therefore, the liquid crystal layer 3g of the G pixels 12g(240, 1) to 12g(240, 320) in the 240-th row is driven substantially at the same time when the liquid crystal layers 3b and 3r of the B and R pixels 12b(1, 1) to 12b(1, 320) and 12r(1, 1) to 12r(1, 320) in the first row are driven.

Thereafter, in the B and R display units 6b and 6r, the scanning electrodes 17b and 17r are sequentially scanned from the upper side to the lower side of FIG. 1. In the G display unit 6g, the scanning electrodes 17g are sequentially scanned from the lower side to the upper side of FIG. 1. Therefore, the liquid crystal layer 3g of the G pixels 12g(241−i, 1) to 12g(241−i, 320) in a (241−i)-th row is driven substantially at the same time when the liquid crystal layers 3b and 3r of the B and R pixels 12b(i, 1) to 12b(i, 320) and 12r(i, 1) to 12r(i, 320) in an i-th row are driven.

Figure 6:
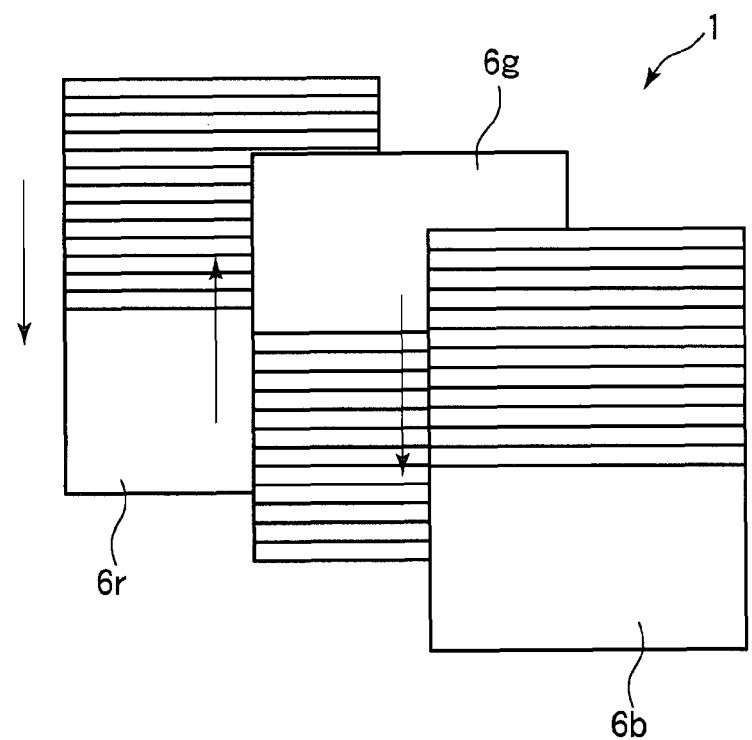
FIG. 6 is a diagram illustrating the state of a screen on which one frame of image is being displayed by line sequential scanning of the liquid crystal display element 1 according to the first embodiment.

FIG. 6 is a diagram illustrating the state of the screen on which one frame of image is being displayed by the line sequential scanning according to this embodiment. In FIG. 6, the laminated display units 6b, 6g, and 6r are separately shown such that their display states are viewed. Arrows on the left sides of the display units 6b, 6g, and 6r indicate the scanning directions of the scanning electrodes 17b, 17g, and 17r of the display units 6b, 6g, and 6r. As represented by the arrows, in the B and R display units 6b and 6r, the scanning electrodes 17b and 17r are sequentially scanned from the upper side to the lower side, and in the G display unit 6g, the scanning electrodes 17g are sequentially scanned from the lower side to the upper side. In this way, images are formed on the B and R display units 6b and 6r from the upper side to the lower side, and an image is formed on the G display unit 6g from the lower side to the upper side.

As described above, according to this embodiment, in the B and R display units 6b and 6r and the G display unit 6g, line sequential scanning is performed at different scanning start positions and in the opposite direction. Therefore, when half of one frame period has elapsed, an overlap image of the B and R display units 6b and 6r is displayed on the upper half of the display screen, and the image of the G display unit 6g is displayed on the lower half of the screen. In this way, the images of the B and R display units 6b and 6r and the G display unit 6g are displayed on somewhere of the entire display screen.

Therefore, it is possible for an observer to recognize the content of the image displayed on the screen in a short time during screen rewriting, as compared to the structure in which all the display units 6b, 6g, and 6r are scanned at the same scanning start position and in the same scanning direction. According to this embodiment, it is possible to reduce the time required for the observer to recognize the content of the image displayed on the screen to about half that of the related art.

Next, an example of a method of manufacturing the liquid crystal display element 1 will be simply described.

ITO transparent electrodes are formed on two polycarbonate (PC) film substrates each having a size of 10 (cm)×8 (cm) and then patterned by etching to form strip-shaped electrodes (the scanning electrodes 17 or the data electrodes 19) at a pitch of 0.24 mm. Strip-shaped electrodes are formed on two PC film substrates 7 and 9 so as to support the QVGA resolution of 320×240 dots. Then, a polyimide-based alignment film material is applied with a thickness of about 700 Å on the strip-shaped transparent electrodes 17 and 19 of the two PC film substrates 7 and 9 by a spin coating method. Then, the two PC film substrates 7 and 9 having the alignment film material applied thereon are baked in an oven at a temperature of 90° C. for one hour, thereby forming alignment films. Subsequently, an epoxy-based sealing material 21 is applied at the edge of one of the PC film substrates 7 and 9 by a dispenser to form a wall having a predetermined height.

Then, spacers (produced by Sekisui Fine_Chemicals Co., Ltd.) having a diameter of 4 μm are dispersed in the other substrate of the two PC film substrates 9 and 7. Then, the two PC film substrates 7 and 9 are bonded to each other and then heated at a temperature of 160° C. for one hour to harden the sealing material. Subsequently, B cholesteric liquid crystal is injected by a vacuum injection method and an inlet for liquid crystal injection is sealed by an epoxy-based sealing material, thereby manufacturing the B display unit 6b. The G and R display units 6g and 6r are manufactured by the same method as described above.

Then, as shown in FIG. 2, the B, G, and R display units 6b, 6g, and 6r are sequentially laminated on the display surface. Subsequently, the visible light absorbing layer 15 is provided on the rear surface of the lower substrate 9r of the R display unit 6r. Then, a general-purpose STN driver IC having a TCP (tape carrier package) structure is connected to the terminals of the scanning electrodes 17b, 17g, and 17r and the terminals of the data electrodes 19b, 19g, and 19r of the laminated B, G, and R display units 6b, 6g, and 6r by flexible cables, and then a power supply circuit and the control circuit 23 are connected thereto. In this way, the liquid crystal display element 1 capable of supporting the QVGA resolution is manufactured. Although not shown in the drawings, an input/output device (not shown) and a control device (not shown) for control the overall operation of the liquid crystal display element 1 are provided in the liquid crystal display element 1, thereby completing an electronic paper.

As described above, according to this embodiment, in the B and R display units 6b and 6r and the G display unit 6g, line sequential scanning is performed at different scanning start positions and in the opposite direction. When half of one frame period has elapsed, the images of the B and R display units 6b and 6r and the image of the G display unit 6g can be displayed on somewhere of the entire display screen. Therefore, according to the liquid crystal display element 1 and the electronic paper using the same, it is possible for an observer to recognize the content of the image displayed on the screen in a short time during screen rewriting.

Second Embodiment

A display element, a method of driving the same, and an electronic paper including the same according to a second embodiment of the invention will be described below with reference to FIGS. 7 to 16. This embodiment uses a liquid crystal display element that has the same structure as that in the first embodiment and uses the cumulative response characteristics of cholesteric liquid crystal to perform multi-tone display. When a pulse voltage is applied to the cholesteric liquid crystal plural times, the cholesteric liquid crystal can be changed from a planar state to a focal conic state or from the focal conic state to the planar state by the cumulative response characteristics.

Figure 7:
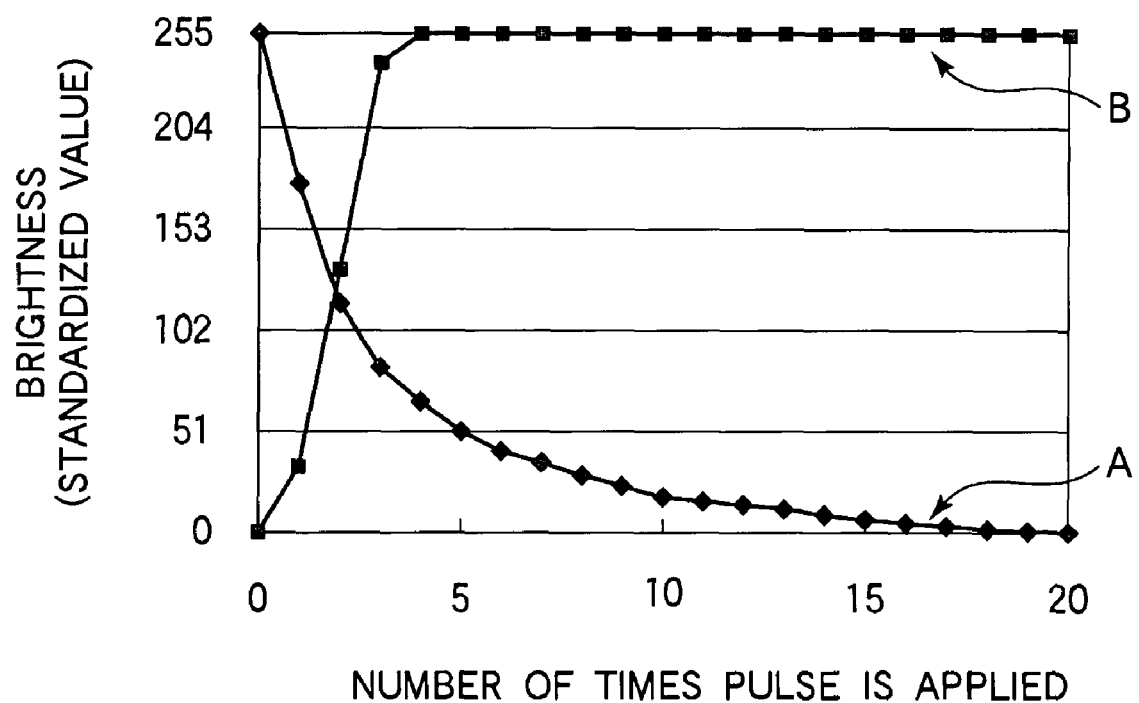
FIG. 7 is a graph illustrating a cumulative response characteristic of the cholesteric liquid crystal.

FIG. 7 is a graph illustrating the cumulative response characteristics of the cholesteric liquid crystal. In FIG. 7, the horizontal axis indicates the number of times a pulse voltage is applied to the cholesteric liquid crystal, and the vertical axis indicates brightness, which is a standardized value. In this case, a brightness value is 0 when the cholesteric liquid crystal is in the focal conic state, and a brightness value is 255 when the cholesteric liquid crystal is in the planar state. In FIG. 7, a curved line A linking symbols ♦ indicates the relationship between the brightness and the number of times a predetermined pulse voltage in the range represented by the dotted rectangle A in FIG. 5 (a halftone region A) is applied to the cholesteric liquid crystal in the planar state. In FIG. 7, a curved line B linking symbols ■ indicates the relationship between the brightness and the number of times a predetermined pulse voltage in the range represented by the dotted rectangle B in FIG. 5 (a halftone region B) is applied to the cholesteric liquid crystal.

As represented by the curved line A in FIG. 7, when the initial state of the cholesteric liquid crystal is a planar state and a predetermined pulse voltage in the halftone region A in FIG. 5 is continuously applied to the cholesteric liquid crystal, the state of the cholesteric liquid crystal is changed from the planar state (brightness value: 255) to the focal conic state (brightness value: 0) according to the number of times the pulse voltage is applied. As represented by the curved line B in FIG. 7, when a predetermined pulse voltage in the halftone region B in FIG. 5 is continuously applied to the cholesteric liquid crystal, the state of the cholesteric liquid crystal is changed from the focal conic state (brightness value: 0) to the planar state (brightness value: 255) according to the number of times the pulse voltage is applied, regardless of the initial state of the cholesteric liquid crystal. Therefore, it is possible to display a desired grayscale adjusting the number of times a pulse voltage is applied.

As shown in FIG. 7, the brightness value varies from 0 to 255 more slowly in the curved line A than in the curved line B. Therefore, for multi-tone display, it is more preferable to use the cumulative response of the halftone region A shown in FIG. 5 to obtain high color reproducibility at a high gray-scale level and color uniformity than to use the cumulative response of the halftone region B. Accordingly, this embodiment uses a multi-tone display method using the cumulative response in the halftone region A of the cholesteric liquid crystal.

Figure 8:
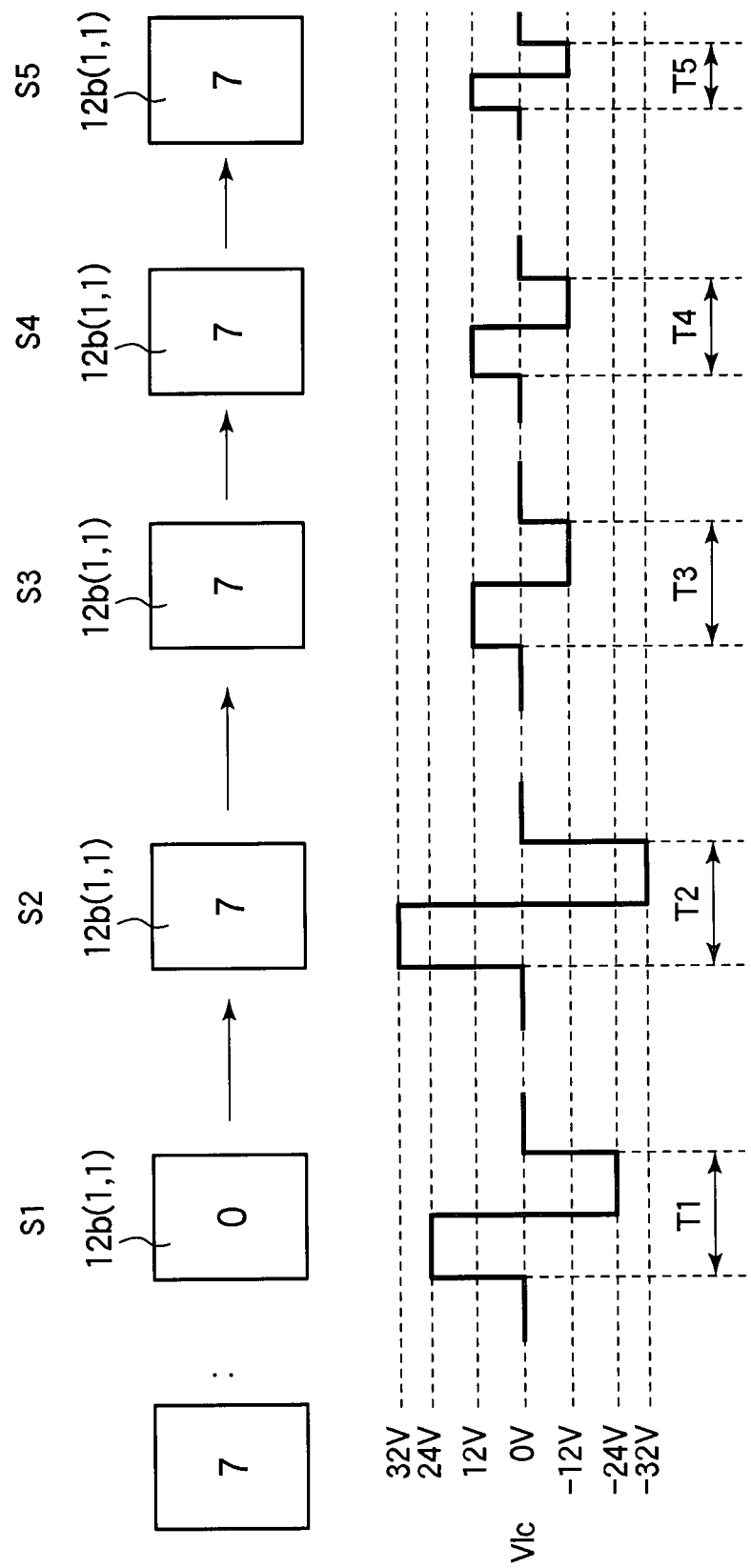
FIG. 8 is a diagram illustrating a process of displaying level 7 (blue) in a multi-tone display method according to a second embodiment.

Next, a detailed method of multi-tone display according to this embodiment will be described with reference to FIGS. 8 to 15. Hereinafter, an example in which the blue (B) pixel 12b(1, 1) of the liquid crystal display element 1 according to the first embodiment performs display at any one of 8 grayscale levels from level 7 (blue) to level 0 (black) will be described. At grayscale level 7, the cholesteric liquid crystal in the pixel is in the planar state and has high reflectance. At grayscale level 0, the cholesteric liquid crystal is in the focal conic state and has low reflectance. FIG. 8 shows a process of making the grayscale of the B pixel 12b(1, 1) at the level 7 (blue). Similarly, FIGS. 9 to 15 show processes of making the grayscale of the pixel at levels 6 to 0, respectively.

In FIGS. 8 to 15, a rectangle on the upper left side schematically illustrates the outer appearance of the B pixel 12b (1, 1), and the value in the rectangle indicates a desired grayscale level. In addition, cumulative response processing steps of obtaining the desired grayscale level of the B pixel 12b(1, 1) are shown on the right side of the rectangle together with arrows indicating the steps in time series and a variation in the grayscale level in the pixel. In FIGS. 8 to 15, a lower part shows a pulse voltage Vlc that is applied to the B pixel 12b (1, 1) in each of the cumulative response processing steps.

As shown in the drawings, in this embodiment, cumulative response processing is performed in five steps from Step S1 to Step S5. In step S1, in order to reset the current grayscale level of the pixel, a pulse voltage Vlc (=±24 V) corresponding to level 0 at which the cholesteric liquid crystal is in the focal conic state is applied for an application time T1 (=2.0 ms). As shown in FIGS. 8 to 15, the reset process in Step S1 is performed at any level of the levels 7 to 0.

Then, in Step S2, a pulse voltage Vlc corresponding to the level 7 or the level 0 is applied for an application time T2 (=2.0 ms). As shown in FIGS. 8 to 14, when a desired grayscale level is any one of the level 7 and the levels 6 to 1 (halftone), a pulse voltage Vlc of ±32 V is applied. In this way, it is possible to change the cholesteric liquid crystal to the planar state in advance in order to use the cumulative response in the halftone region A shown in FIG. 5.

Further, as shown in FIG. 15, when a desired grayscale level is the level 0, in Step S2, a pulse voltage Vlc of ±24 V is applied. At the level 0, it is not necessary to use the cumulative response. Therefore, in Step S2, it is possible to change the cholesteric liquid crystal in the focal conic state.

Then, in Steps S3 to S5, a predetermined pulse voltage Vlc is applied for predetermined application times T3 to T5. As shown in FIGS. 8 to 15, in Steps S3 to S5, a pulse voltage Vlc having a level capable of changing the cholesteric liquid crystal from the planar state to the focal conic state using the cumulative response in the halftone region A or a pulse voltage Vlc having a level capable of maintaining the state of the cholesteric liquid crystal without changing the state is applied. In this embodiment, a pulse voltage of ±24 V is applied to change the cholesteric liquid crystal from the planar state to the focal conic state. In addition, a pulse voltage of ±12 V is applied to maintain the state of the cholesteric liquid crystal without changing the state.

In Steps S3 to S5, the application times T3 to T5 of the pulse voltage are different from each other. It is possible to change the state of the cholesteric liquid crystal by changing the pulse width of a pulse voltage applied as well as by changing the level of a pulse voltage applied. In the halftone region A shown in FIG. 5, it is possible to change the cholesteric liquid crystal to the focal conic state by lengthening the pulse width of a pulse voltage applied. In this embodiment, a pulse voltage application time T3 is set to 2.0 ms in Step S3, a pulse voltage application time T4 is set to 1.5 ms in Step S4, and a pulse voltage application time T5 is set to 1.0 ms in Step S5.

It is possible to control the pulse voltage application times T1 to T5 by lowering the frequency of clocks for driving the scanning electrode driving circuit 25 and the data electrode driving circuit 27 to lengthen an output period. In order to stably switch the pulse width, it is more stable to logically change the division ratio of a clock generating unit that generates a clock input to a driver than to change the clock frequency in an analog manner.

In this way, $2^3$ (=8) driving patterns are obtained by a combination of two kinds of pulse voltages (±24 V and ±12 V) and three kinds of pulse widths (2.0 ms, 1.5 ms, and 1.0 ms) that are arranged in time series. Table 1 shows the above-mentioned driving patterns. Specifically, Table 1 shows the pulse width (the period for which the pulse voltage is applied) (ms) of the pulse voltage applied to the B pixel 12b(1, 1) in Steps S1 to S5 and the level (V) of the pulse voltage applied in Steps S1 to S5 for each of the grayscale levels 7 (blue) to 0 (black).

TABLE 1

| Application time | S1 2.0 ms | S2 2.0 ms | S3 2.0 ms | S4 1.5 ms | S5 1.0 ms |
|---|---|---|---|---|---|
| Level 7 (blue) | ±24 V | ±32 V | ±12 V | ±12 V | ±12 V |
| Level 6 | ±24 V | ±32 V | ±12 V | ±12 V | ±24 V |
| Level 5 | ±24 V | ±32 V | ±12 V | ±24 V | ±12 V |
| Level 4 | ±24 V | ±32 V | ±12 V | ±24 V | ±24 V |
| Level 3 | ±24 V | ±32 V | ±24 V | ±12 V | ±12 V |
| Level 2 | ±24 V | ±32 V | ±24 V | ±12 V | ±24 V |
| Level 1 | ±24 V | ±32 V | ±24 V | ±24 V | ±12 V |
| Level 0 (black) | ±24 V | ±24 V | ±24 V | ±24 V | ±24 V |

In order to make the grayscale of the B pixel 12b(1, 1) at level 7 (blue), as shown in Table 1 and FIG. 8, a pulse voltage Vlc of ±12 V is applied to the cholesteric liquid crystal in Steps S3 to S5. In Step S2, a pulse voltage Vlc of ±32 V has already been applied to change the cholesteric liquid crystal to the planar state, thereby obtaining the grayscale level 7. Therefore, in Steps S3 to S5, a pulse voltage Vlc of ±12 V is applied to maintain the previous state, thereby making the grayscale of the pixel at the level 7.

Figure 9:
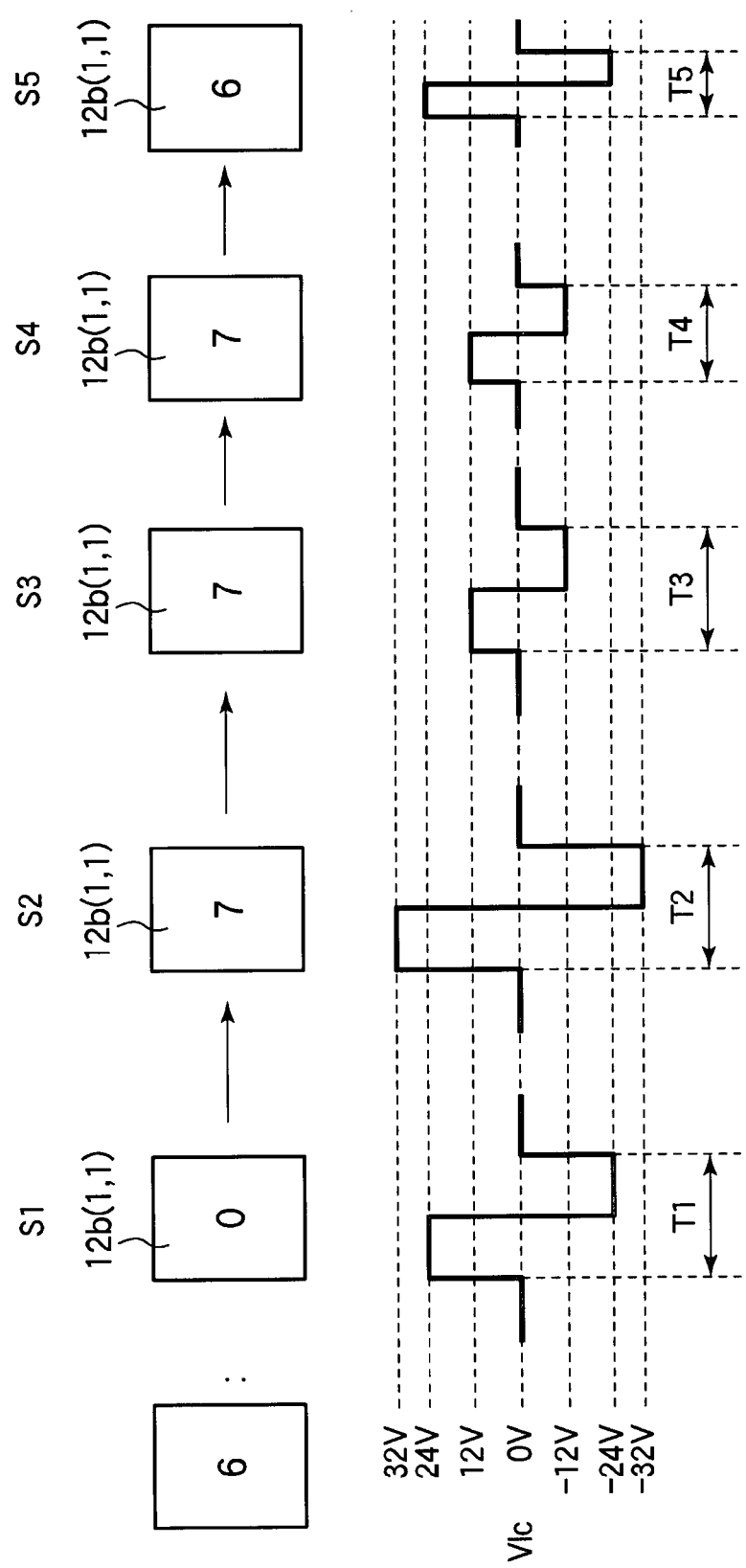
FIG. 9 is a diagram illustrating a process of displaying level 6 in the multi-tone display method according to the second embodiment.

In order to make the grayscale of the B pixel 12b(1, 1) at level 6, as shown in Table 1 and FIG. 9, in Steps S3 and S4, a pulse voltage Vlc of ±12 V is applied to maintain the planar state (level 7) up to Step S4. Then, in the next Step S5, a pulse voltage Vlc of ±24 V is applied to the cholesteric liquid crystal for a time of 1.0 ms to change the state of the cholesteric liquid crystal close to the focal conic state by a predetermined amount, thereby obtaining the grayscale level 6 that is one level lower than the level 7.

Figure 10:
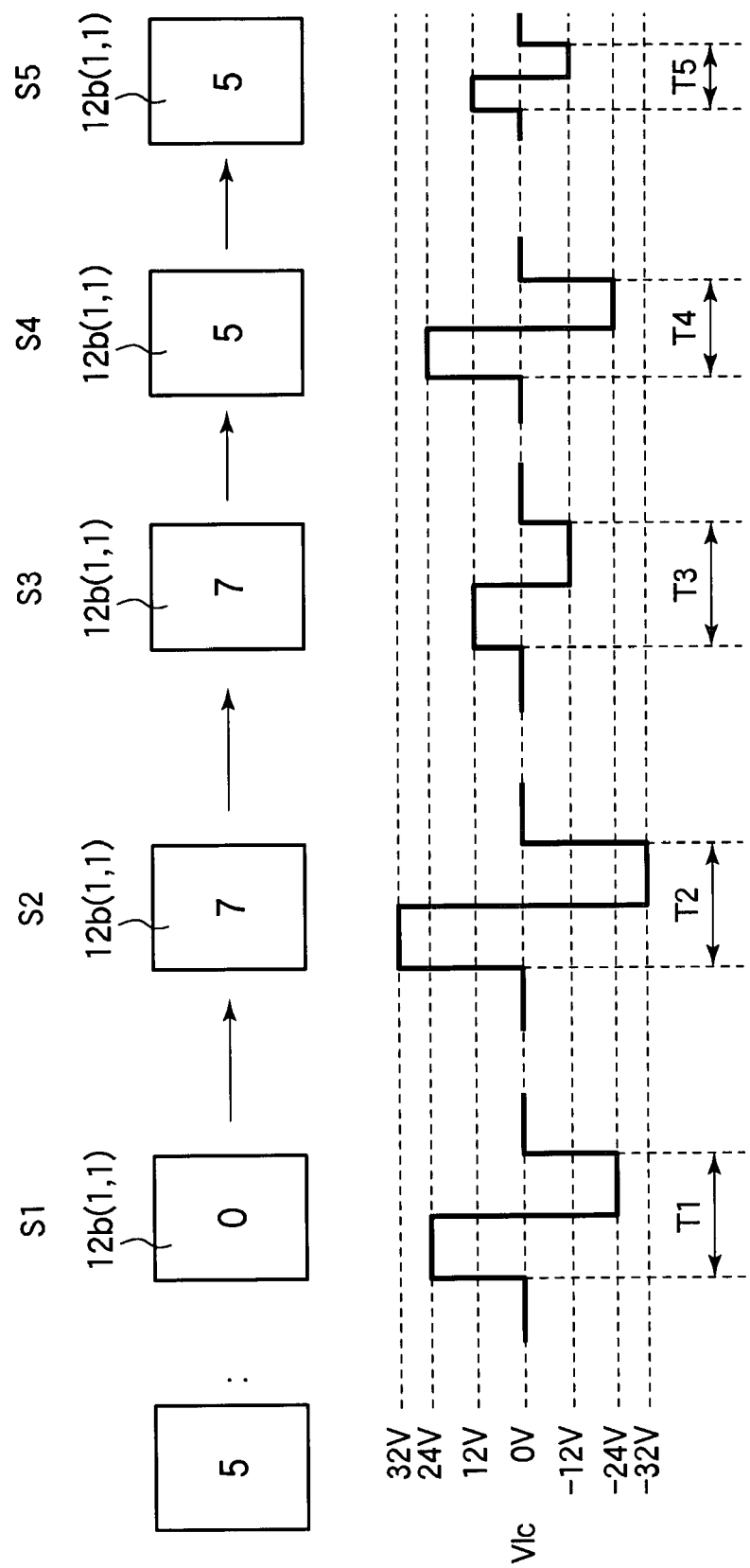
FIG. 10 is a diagram illustrating a process of displaying level 5 in the multi-tone display method according to the second embodiment.

In order to make the grayscale of the B pixel 12b(1, 1) at level 5, as shown in Table 1 and FIG. 10, in Step S3, a pulse voltage Vlc of ±12 V is applied to maintain the level 7. Then, in the next Step S4, a pulse voltage Vlc of ±24 V is applied to the cholesteric liquid crystal for a time of 1.5 ms to change the state of the cholesteric liquid crystal close to the focal conic state by a predetermined amount. In Step S4, since a pulse voltage Vlc of ±24 V is applied to the cholesteric liquid crystal for a time that is 1.5 times longer than that in Step S5, the grayscale level 5 that is one level lower than the level 6 shown in FIG. 9 is obtained. Then, in the next Step S5, a pulse voltage Vlc of ±12 V is applied to the cholesteric liquid crystal to maintain the level 5.

Figure 11:
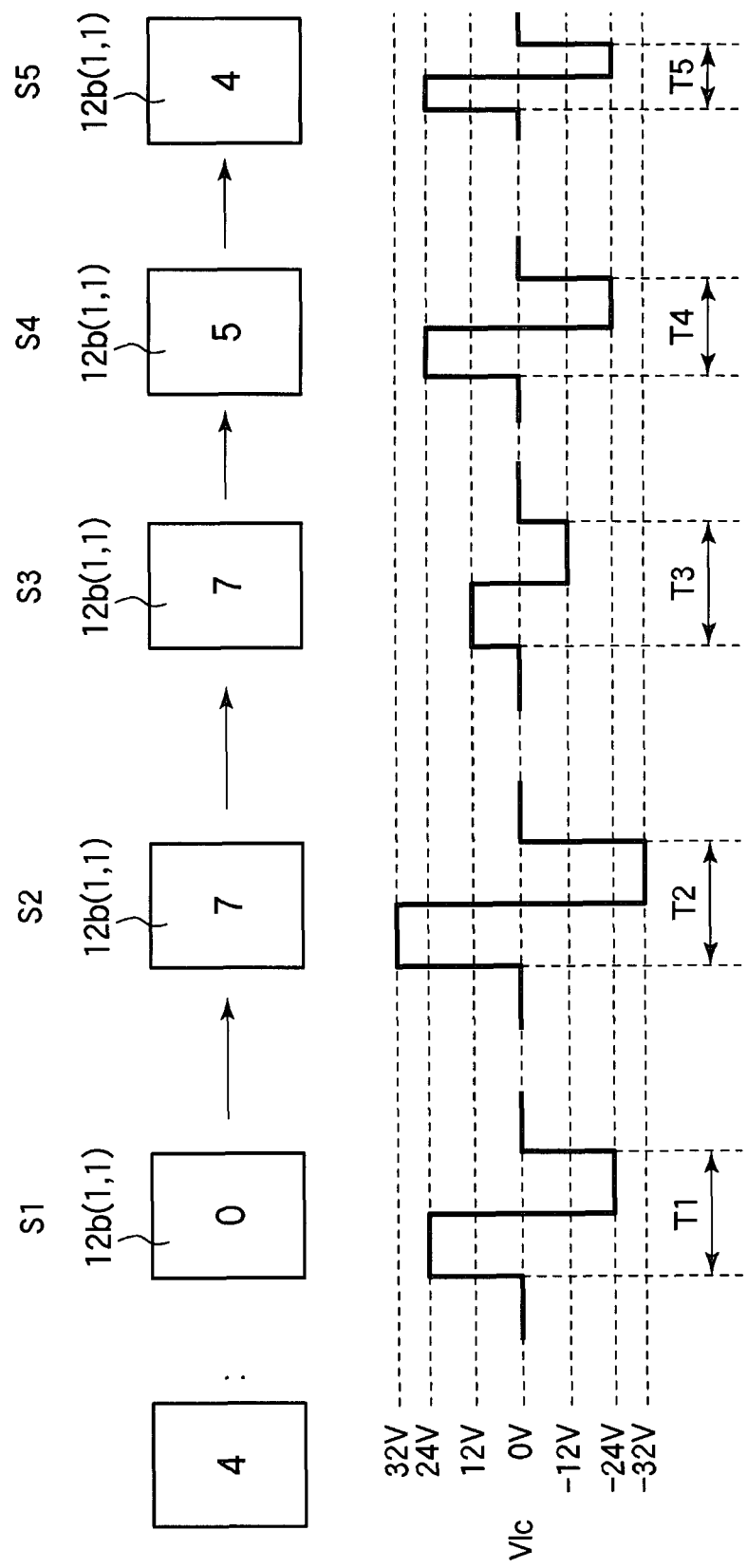
FIG. 11 is a diagram illustrating a process of displaying level 4 in the multi-tone display method according to the second embodiment.

In order to make the grayscale of the B pixel 12b(1, 1) at level 4, as shown in Table 1 and FIG. 11, in Step S3, a pulse voltage Vlc of +12 V is applied to the cholesteric liquid crystal to maintain the level 7. Then, in the next Step S4, a pulse voltage Vlc of ±24 V is applied to the cholesteric liquid crystal for a time of 1.5 ms to change to grayscale level 5 that is two levels lower than the level 7. In the next Step S5, a pulse voltage Vlc of ±24 V is applied to the cholesteric liquid crystal for a time of 1.0 ms to change the state of the cholesteric liquid crystal close to the focal conic state by a predetermined amount, thereby obtaining the grayscale level 4 that is one level lower than the level 5.

Figure 12:
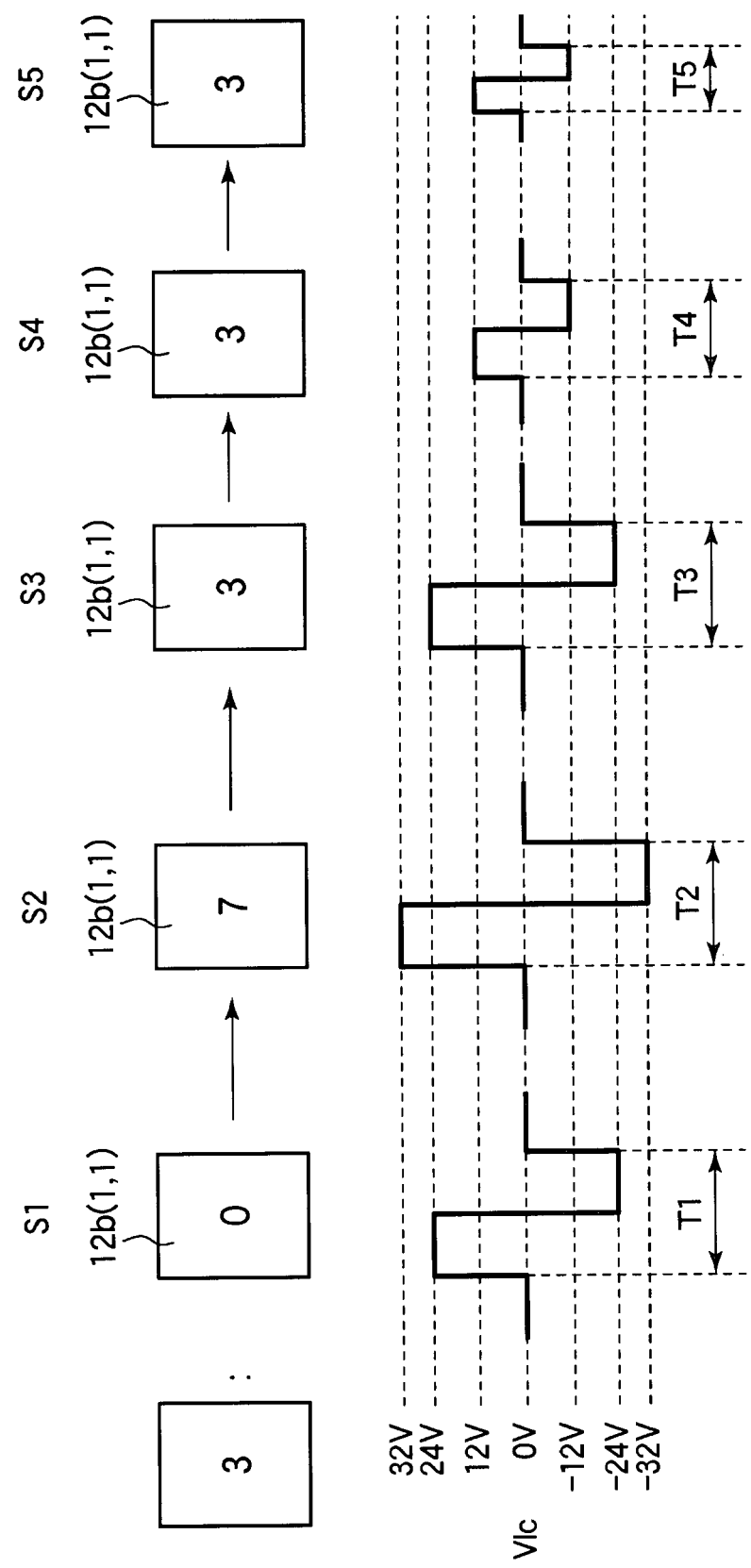
FIG. 12 is a diagram illustrating a process of displaying level 3 in the multi-tone display method according to the second embodiment.

In order to make the grayscale of the B pixel 12b(1, 1) at level 3, as shown in Table 1 and FIG. 12, in Step S3, a pulse voltage Vlc of ±24 V is applied to the cholesteric liquid crystal for a time of 2.0 ms. In this way, the cholesteric liquid crystal is greatly changed from the planar state (level 7) close to the focal conic state, and the grayscale level 3 that is four levels lower than the grayscale level 7 is obtained. Since the grayscale level 3 is obtained in Step S3, a pulse voltage Vlc of ±12 V for maintaining the previous state is applied to the cholesteric liquid crystal to make the grayscale level 3 in Steps S4 and S5.

Figure 13:
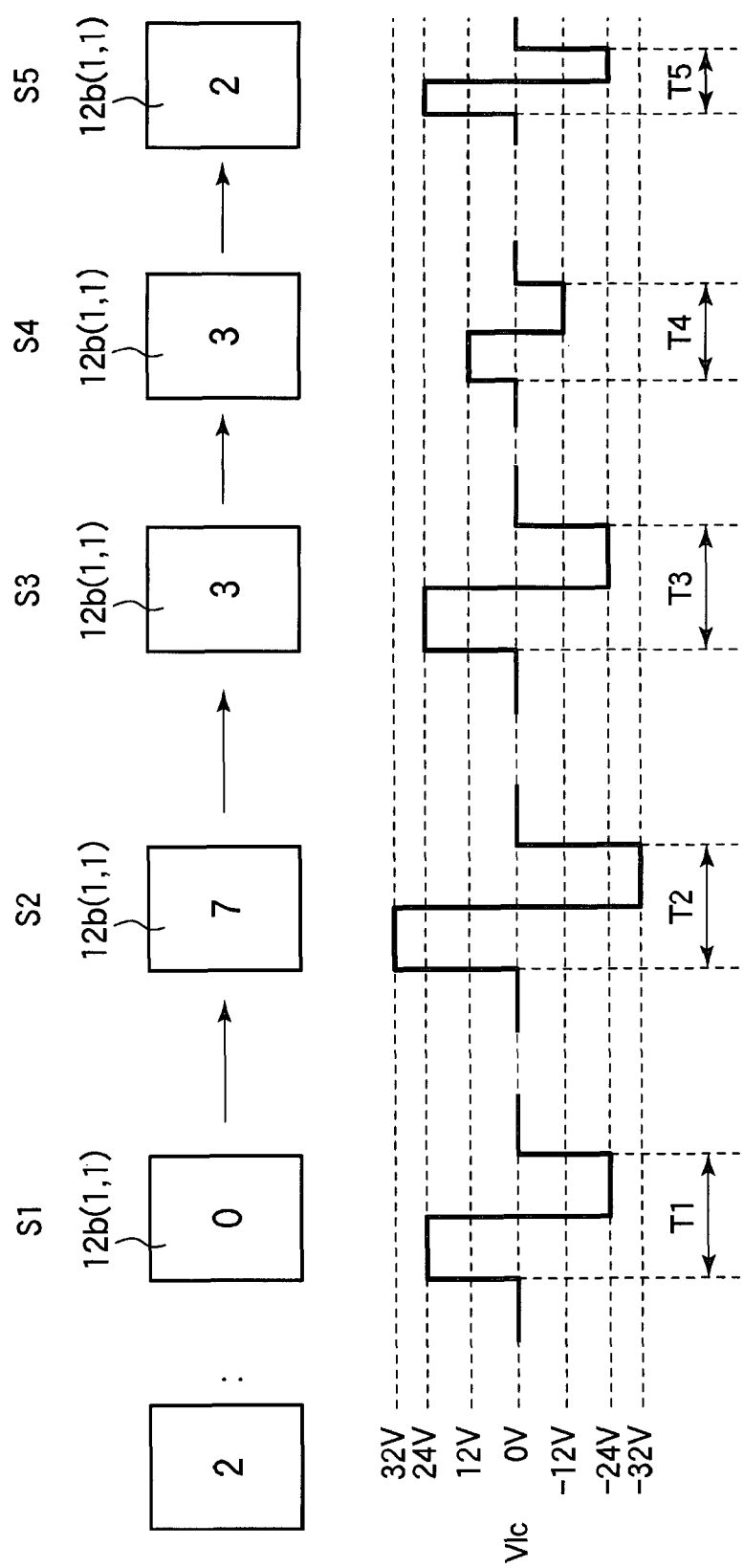
FIG. 13 is a diagram illustrating a process of displaying level 2 in the multi-tone display method according to the second embodiment.

In order to make the grayscale of the B pixel 12b(1, 1) at level 2, as shown in Table 1 and FIG. 13, in Step S3, a pulse voltage Vlc of ±24 V is applied to the cholesteric liquid crystal for a time of 2.0 ms. In this way, the grayscale level 3 is obtained. Then, in the next Step S4, a pulse voltage Vlc of ±12 V for maintaining the previous state is applied to the cholesteric liquid crystal to maintain the grayscale level 3. In the next Step S5, a pulse voltage Vlc of ±24 V is applied to the cholesteric liquid crystal for a time of 1.0 ms to slightly change the state of the cholesteric liquid crystal close to the focal conic state, thereby obtaining the grayscale level 2 that is one level lower than the level 3.

Figure 14:
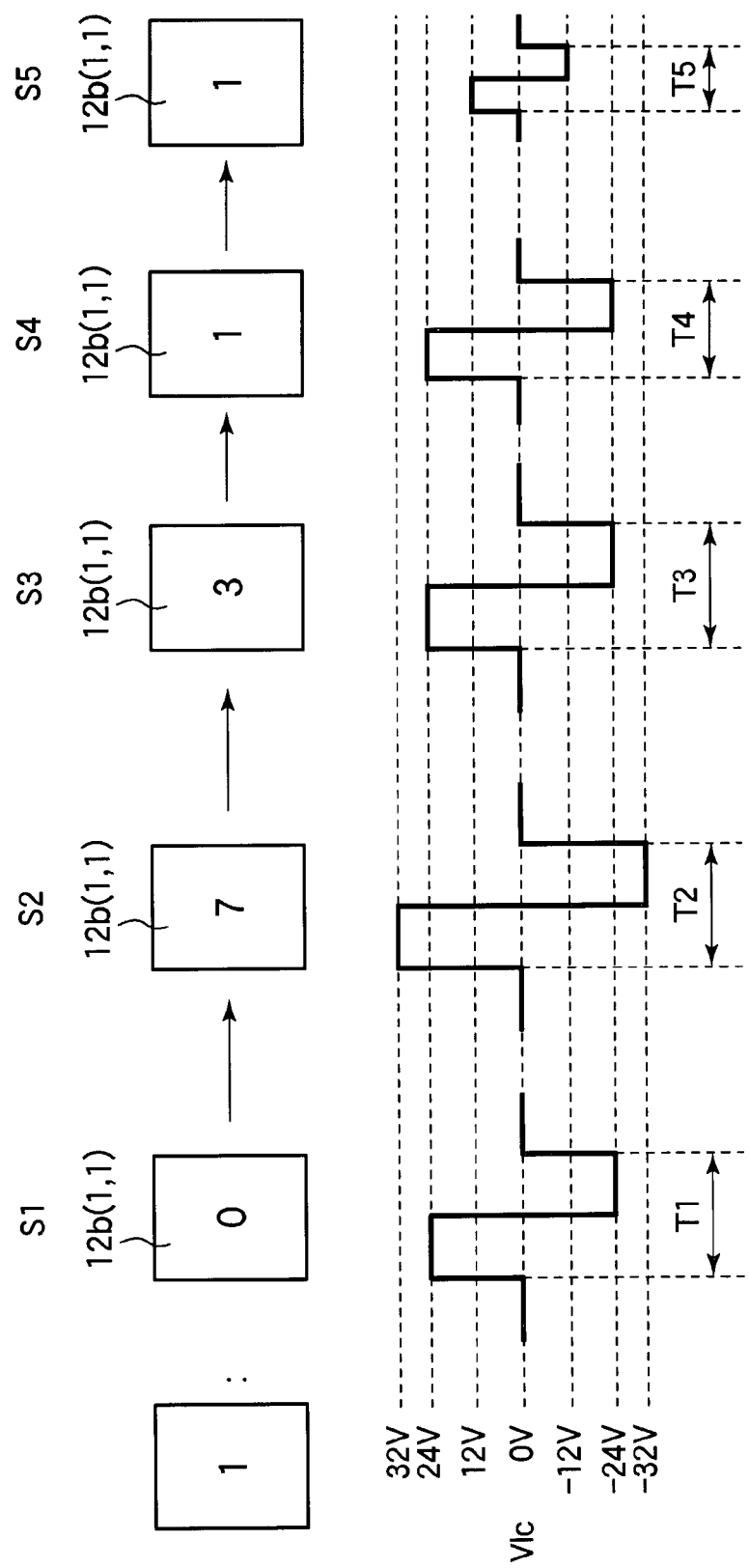
FIG. 14 is a diagram illustrating a process of displaying level 1 in the multi-tone display method according to the second embodiment.

In order to make the grayscale of the B pixel 12b(1, 1) at level 1, as shown in Table 1 and FIG. 14, in Step S3, a pulse voltage Vlc of ±24 V is applied to the cholesteric liquid crystal for a time of 2.0 ms, thereby obtaining the grayscale level 3. Then, in the next Step S4, a pulse voltage Vlc of ±24 V is applied to the cholesteric liquid crystal for a time of 1.5 ms, thereby obtaining the grayscale level 1 that is two levels lower than the grayscale level 3. In Step S5, a pulse voltage Vlc of ±12 V for maintaining the previous state is applied to the cholesteric liquid crystal to maintain the grayscale level 1, thereby making the grayscale of the pixel at level 1.

In order to make the grayscale of the B pixel 12b(1, 1) at level 0 (black), as shown in Table 1 and FIG. 15, in Steps S3 to S5, a pulse voltage Vlc of ±24 V is applied to the cholesteric liquid crystal to change the cholesteric liquid crystal to the focal conic state and maintain the focal conic state.

During a non-driving period between Steps, as described with reference to FIG. 4 in the first embodiment, a pulse voltage Vlc of ±4 V or ±8 V may be applied to the cholesteric liquid crystal.

In the multi-tone display method according to this embodiment, a pulse voltage Vlc is also repeatedly applied plural times to make the pixel in a pure black state (level 0). When a pulse voltage is applied only one time, light black is likely to be obtained due to weak scatter reflection. However, according to this embodiment, it is possible to perform high-contrast display with deep black. In addition, since a low pulse voltage is used, it is possible to stably prevent crosstalk in a non-selection region.

In this embodiment, display is performed at 8 grayscale levels. However, it is possible to perform display at 16 or more grayscale levels by increasing the number of steps. Whenever the number of steps is increased one by one, the number of grayscale levels can be increased two times.

It is possible to display 512 colors (in the case of 8 grayscale levels) or more on the pixel 12(1, 1), which is a laminate of three B, G, and R pixels 12b(1, 1), 12g(1, 1), and 12r(1, 1), by driving the green (G) pixel 12g(1, 1) and the red (R) pixel 12r(1, 1) by the same method as that driving the B pixel 12b(1, 1).

In the above-described multi-tone display method, it is possible to perform multi-tone display using inexpensive general-purpose binary drivers, without using a specific driver IC capable of generating a multi-level driving waveform. Therefore, it is possible to perform multi-tone (multi-color) display at a low cost.

Next, a method of driving the liquid crystal display element 1 using the multi-tone display according to this embodiment will be described with reference to FIGS. 16A to 16C. In the multi-tone display method, in Step S1 of resetting a display grayscale, all the scanning electrodes 17b, 17g, and 17r are simultaneously selected, and a pulse voltage Vlc of ±24 V is applied to all the data electrodes 19b, 19g, and 19r for a time of 2.0 ms to obtain grayscale level 0.

Then, Step S2 is performed for the first frame. FIG. 16A shows the state of the screen on which the first frame is being displayed by line sequential scanning. In FIG. 16A, the laminated display units 6b, 6g, and 6r are separately shown such that their display states are viewed. Arrows on the right sides of the display units 6b, 6g, and 6r indicate the scanning directions of the scanning electrodes 17b, 17g, and 17r of the display units 6b, 6g, and 6r. As represented by the arrows, in the B and R display units 6b and 6r, the scanning electrodes 17b and 17r are sequentially scanned from the upper side to the lower side, and in the G display unit 6g, the scanning electrodes 17g are sequentially scanned from the lower side to the upper side. In this way, grayscales are displayed on the B and R display units 6b and 6r from the upper side to the lower side, and a grayscale is displayed on the G display unit 6g from the lower side to the upper side. In FIGS. 16A to 16C, straight lines 37b, 37g, and 37r across the display units 6b, 6g, and 6r indicate scanning positions at a predetermined time.

As described above, similar to the first embodiment, in the B and R display units 6b and 6r and the G display unit 6g, line sequential scanning is performed at different scanning start positions and in the opposite direction. Therefore, when half of the first frame period has elapsed, an overlap image of an image corresponding to a predetermined grayscale level 7 or 0 of each of the pixels 12b(1, 1) to 12b(120, 320) in the upper half of the B display unit 6b and an image corresponding to a predetermined grayscale level 7 or 0 of each of the pixels 12r(1, 1) to 12r(120, 320) in the upper half of the R display unit 6r is displayed on the upper half of the display screen.

Meanwhile, an image corresponding to the grayscale levels 7 and 0 of the pixels 12g(121, 1) to 12g(240, 320) in the lower half of the G display unit 6g is displayed on the lower half of the display screen. In this way, the grayscale levels 7 and 0 of the B and R display units 6b and 6r or the G display unit 6g are displayed on the entire display screen.

In this step, when a multi-tone image to be displayed includes a lot of black and white regions, the observer can recognize the content of the image in a very short time during screen rewriting, as compared to when scanning is performed at the same scanning start position and in the same scanning direction in all the display units 6b, 6g, and 6r.

Then, Step S3 is performed for the second frame. FIG. 16B shows the state of the screen on which the second frame is being displayed by line sequential scanning, similar to FIG. 16A. As represented by the arrows in FIG. 16B, in the B and R display units 6b and 6r, the scanning electrodes 17b and 17r are sequentially scanned from the lower side to the upper side, and in the G display unit 6g, the scanning electrodes 17g are sequentially scanned from the upper side to the lower side. That is, the display units are scanned in the directions opposite to the scanning directions of the first frame. In this way, grayscales are displayed on the B and R display units 6b and 6r from the lower side to the upper side, and a grayscale is displayed on the G display unit 6g from the upper side to the lower side.

As described above, in the B and R display units 6b and 6r and the G display unit 6g, line sequential scanning is performed at different scanning start positions and in the opposite direction. Therefore, when half of the second frame period has elapsed, in the lower half of the display screen, desired grayscales or grayscales being changed to the desired grayscales are displayed on the pixels 12b(121, 1) to 12b(240, 320) corresponding to the lower half of the B display unit 6b, and desired grayscales or grayscales being changed to the desired grayscales are displayed on the pixels 12r(121, 1) to 12r(240, 320) corresponding to the lower half of the R display unit 6r. In the lower half of the display screen, a predetermined grayscale level 7 or 0 has already been displayed on each of the pixels 12*g*(121, 1) to 12*g*(240, 320) corresponding to the lower half of the G display unit 6*g* in the first frame. Therefore, an overlap image of the grayscales of the B and R display units 6*b* and 6*r* and the G display unit 6*g* is displayed on the lower half of the display screen.

Meanwhile, in the upper half of the display screen, desired grayscales or grayscales being changed to the desired grayscales are displayed on the pixels 12*g*(1, 1) to 12*g*(120, 320) corresponding to the upper half of the G display unit 6*g*. An overlap image of an image corresponding to a predetermined grayscale level 7 or 0 of each of the pixels 12*b*(1, 1) to 12*b*(120, 320) in the upper half of the B display unit 6*b* and an image corresponding to a predetermined grayscale level 7 or 0 of each of the pixels 12*r*(1, 1) to 12*r*(120, 320) in the upper half of the R display unit 6*r* has already been displayed on the upper half of the display screen in the first frame. Therefore, an overlap image of the grayscales of the B and R display units 6*b* and 6*r* and the G display unit 6*g* is displayed on the upper half of the display screen.

In this way, when half of the second frame period has elapsed, a desired grayscale or a grayscale being changed to the desired grayscale, which is an overlap grayscale of the B, G, and R display units 6*b*, 6*g*, and 6*r*, is displayed on the entire display screen. Though it depends on the content of a display, the observer can recognize the content of a displayed image in this step.

Then, Step S4 is performed for the third frame. FIG. 16C shows the state of the screen on which the third frame is being displayed by line sequential scanning, similar to FIG. 16A. The operation of the third frame is the same as that of the first or second frame. When half of the third frame period has elapsed, a desired high grayscale level is displayed, and the degree of recognition of an image increases. Although not shown in the drawings, similarly, Step S5 is performed on the fourth frame. The observer can sufficiently recognize the content of an image at the time when half of the rewriting time of the fourth frame has elapsed at the latest. The transmission of data to the display units 6*b*, 6*g*, and 6*r* is controlled according to the scanning direction and the scanning start position.

As described above, in the method of driving the liquid crystal display element 1 according to this embodiment, similar to the method of driving the liquid crystal display element 1 according to the first embodiment, in the B and R display units 6*b* and 6*r* and the G display unit 6*g*, line sequential scanning is performed at different scanning start positions and in the opposite direction. In addition, the method of driving the liquid crystal display element 1 according to this embodiment is characterized in that scanning is performed in the opposite direction for each frame in the display units 6*b*, 6*g*, and 6*r*.

In the method of driving the liquid crystal display element 1 according to this embodiment, in the B and R display units 6*b* and 6*r* and the G display unit 6*g*, line sequential scanning is performed at different scanning start positions and in the opposite direction. Therefore, in each frame, when half the frame period has elapsed, the scanning electrodes 17*b* and 17*r* or the scanning electrodes 17*g* are scanned on the entire display screen. Therefore, the observer can recognize the content of the image displayed on the screen in a short time during screen rewriting, as compared to a structure in which all the display units 6*b*, 6*g*, and 6*r* are scanned at the same scanning start position and in the same scanning direction.

Further, in the method of driving the liquid crystal display element 1 according to this embodiment, scanning is performed in the opposite direction in the display units 6*b*, 6*g*, and 6*r* for each frame. Therefore, it is possible to shorten the time required for the observer to recognize the content of the image displayed on the screen during the rewriting of images. In particular, it is possible to reduce the time required for the observer to recognize the content of the image displayed on the screen during multi-tone (multi-color) display. In addition, the scanning directions of the display units 6*b*, 6*g*, and 6*r* may be different from each other for each frame, if necessary.

Third Embodiment

Figure 17:
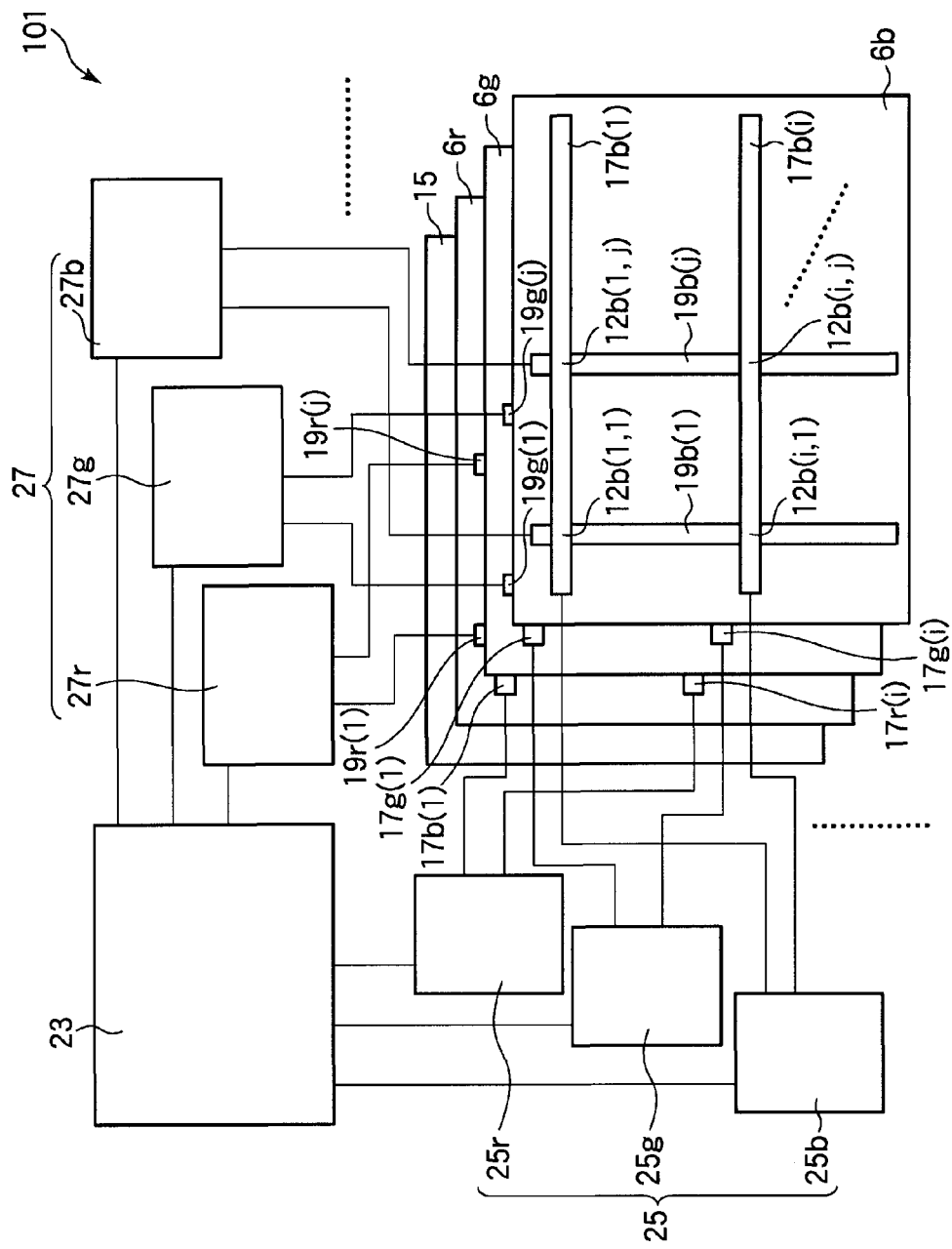
FIG. 17 is a diagram schematically illustrating the structure of a liquid crystal display element 101 according to a third embodiment.

A display element, a method of driving the same, and an electronic paper including the same according to a third embodiment of the invention will be described below with reference to FIGS. 17 and 18. FIG. 17 is a diagram schematically illustrating an example of the structure of a liquid crystal display element 101 according to this embodiment.

The liquid crystal display element 101 according to this embodiment is characterized in that the scanning electrode driving circuit 25 and the data electrode driving circuit 27 are provided for each of the display units 6*b*, 6*g*, and 6*r* unlike the liquid crystal display element 1 according to the first embodiment. The structure of the liquid crystal display element 101 is the same as that of the liquid crystal display element 1 according to the first embodiment except for the above, and thus a description thereof will be omitted. In addition, in this embodiment, components having the same functions and operations as those in the first embodiment are denoted by the same reference numerals, and a description thereof will be omitted.

A scanning electrode driving circuit 25*b* for the B display unit 6*b* is electrically connected to a plurality of scanning electrodes 17*b* of the B display unit 6*b*. A scanning electrode driving circuit 25*g* for the G display unit 6*g* is electrically connected to a plurality of scanning electrodes 17*g* of the G display unit 6*g*. A scanning electrode driving circuit 25*r* for the R display unit 6*r* is electrically connected to a plurality of scanning electrodes 17*r* of the R display unit 6*r*.

A data electrode driving circuit 27*b* for the B display unit 6*b* is electrically connected to a plurality of data electrodes 19*b* of the B display unit 6*b*. A data electrode driving circuit 27*g* for the G display unit 6*g* is electrically connected to a plurality of data electrodes 19*g* of the G display unit 6*g*. A data electrode driving circuit 27*r* for the R display unit 6*r* is electrically connected to a plurality of data electrodes 19*r* of the R display unit 6*r*.

Next, a method of driving the liquid crystal display element 101 will be described with reference to FIG. 18. FIG. 18 is a diagram illustrating the scanning start positions and the scanning directions of the B, G, and R display units 6*b*, 6*g*, and 6*r* during line sequential scanning. In FIG. 18, horizontal lines 38*b*, 38*g*, and 38*r* indicate the scanning start positions of the display units 6*b*, 6*g*, and 6*r*, and arrows indicate the scanning directions of the display units 6*b*, 6*g*, and 6*r*.

Figure 18:
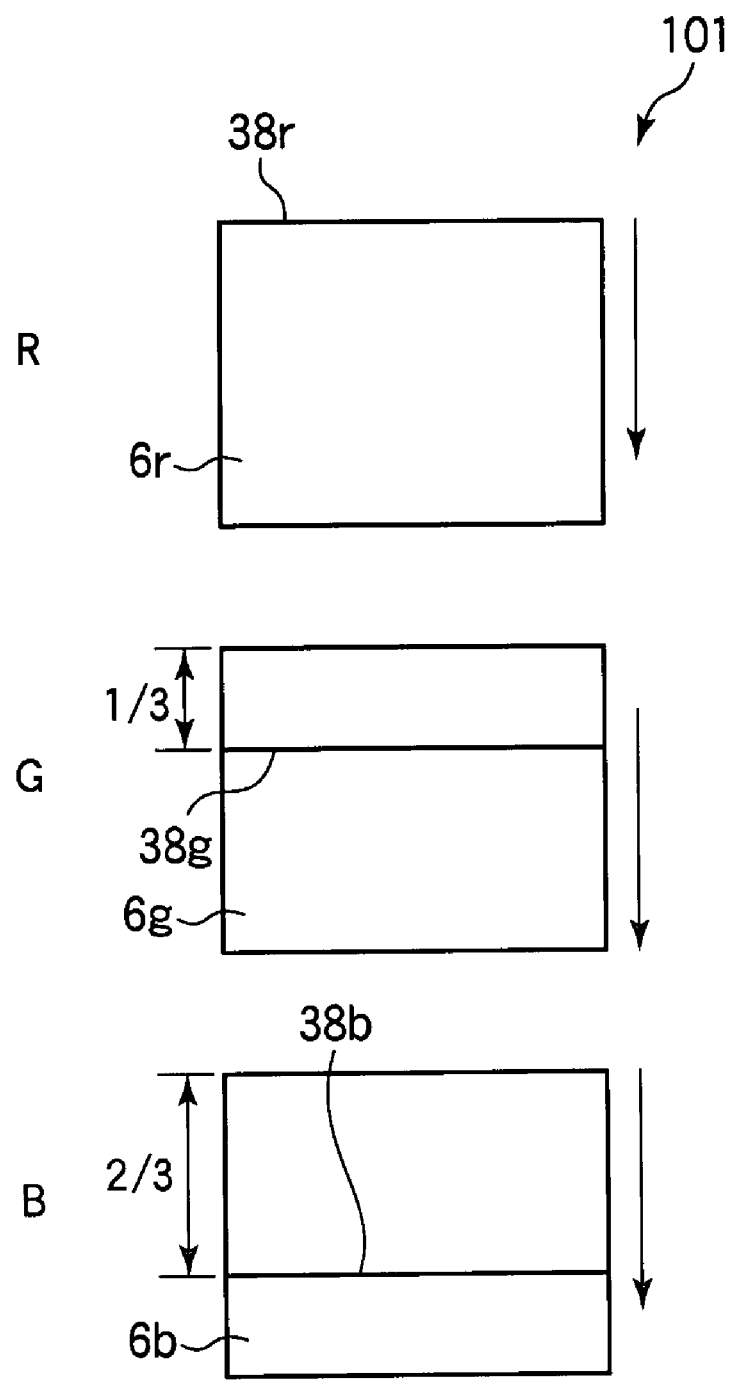
FIG. 18 is a diagram illustrating the scanning start positions and the scanning directions of display units 6b, 6g, and 6r of the liquid crystal display element 101 according to the third embodiment.
Figure 19:
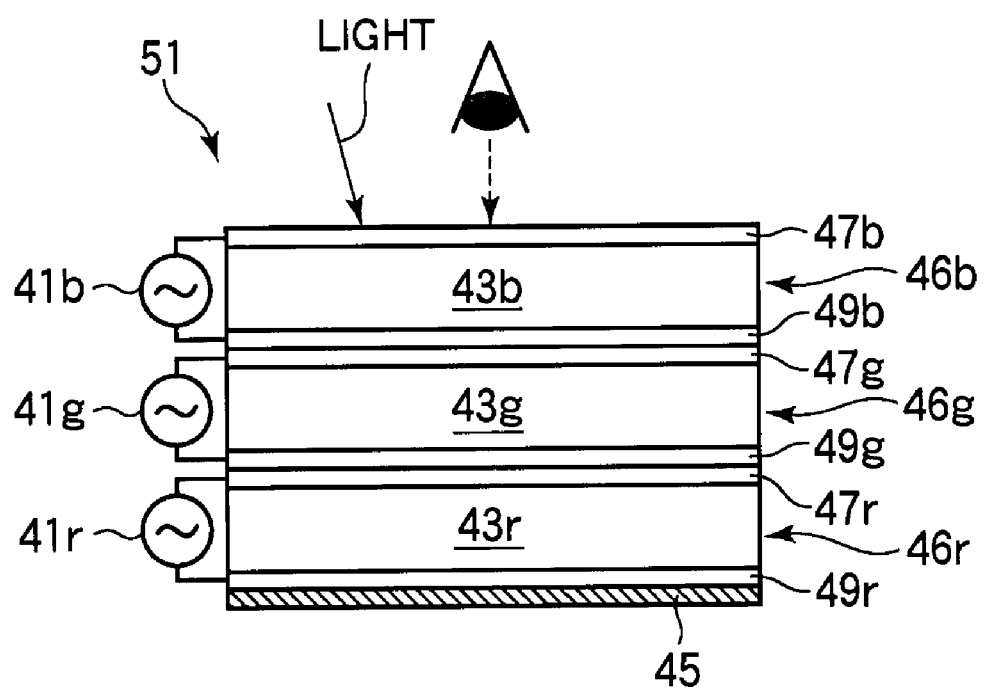
FIG. 19 is a cross-sectional view schematically illustrating the structure of a liquid crystal display element according to related art that is capable of performing full color display.
Figure 20A:
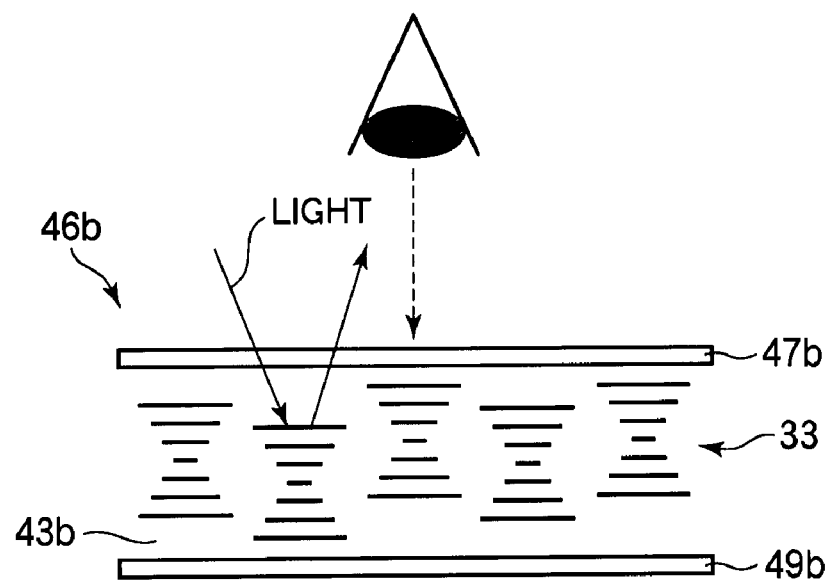
FIGS. 20A and 20B are cross-sectional views schematically illustrating the structure of one liquid crystal layer of the liquid crystal display element according to the related art.
Figure 20B:
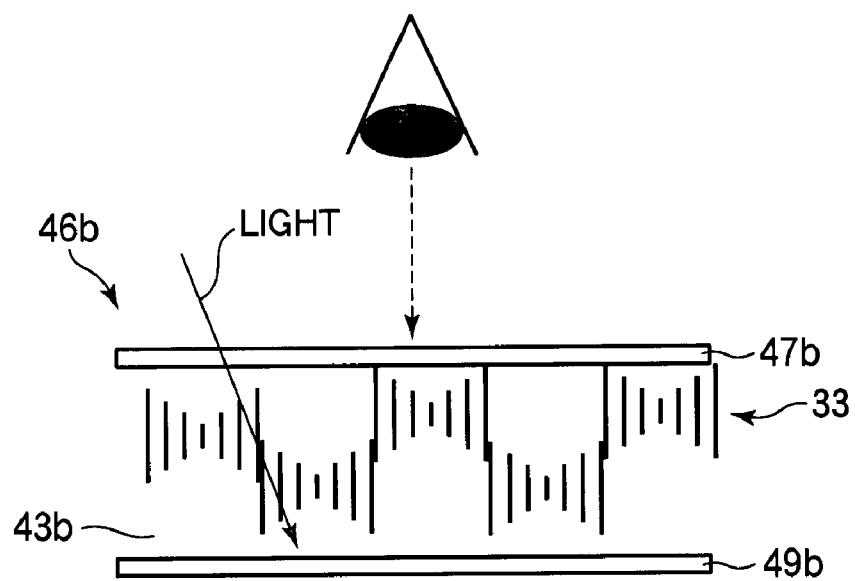

As shown in FIG. 18, in this embodiment, in line sequential scanning, the scanning start positions 38*b*, 38*g*, and 38*r* of the display units 6*b*, 6*g*, and 6*r* deviate from each other by one third of the display screen. For example, scanning starts from the first scanning electrode 17*r*(1) in the R display unit 6*r*, scanning starts from the eighty-first scanning electrode 17*g* (81) in the G display unit 6*g*, and scanning starts from the one hundred sixty-first scanning electrode 17*b*(161) in the B display unit 6*b*. In addition, in all the display units 6*b*, 6*g*, and 6*r*, the scanning electrodes 17*b*, 17*g*, and 17*r* are sequentially scanned from the upper side to the lower side. In the B and G display units 6*b* and 6*g*, the two hundred fortieth scanning electrodes 17*b*(240) and 17*g*(240) are scanned, and then the first scanning electrodes 17*b*(1) and 17*g*(1) are scanned. The transmission of data to the display units 6b, 6g, and 6r is controlled according to the scanning direction and the scanning start position.

When one-third of one frame period has elapsed, the image of the R display unit 6r is displayed on the upper one-third of the display screen, the image of the G display unit 6g is displayed on the middle one-third of the display screen, and the image of the B display unit 6b is displayed on the lower one-third of the display screen.

In this embodiment, in line sequential scanning, the scanning start positions 38b, 38g, and 38r of the display units 6b, 6g, and 6r deviate from each other by one third of the display screen. Therefore, when one-third of one frame period has elapsed, the images of the B, G, and R display units 6b, 6g, and 6r can be displayed on somewhere of the entire display screen. Therefore, the observer can recognize the content of the image displayed on the screen in a short time during screen rewriting, as compared to a structure in which all the display units 6b, 6g, and 6r are scanned at the same scanning start position. The time required for the observer to recognize the content of the image displayed on the screen depends on an image to be displayed. For example, when an image including only characters is displayed, it is possible to reduce the time required for the observer to recognize the content of the image displayed on the screen to one-third of the time in the related art.

The invention is not limited to the above-described embodiments, but various modifications and changes of the invention can be made.

For example, in the above-described embodiments, the liquid crystal display element using the cholesteric liquid crystal is used as an example of the display element, but the invention is not limited thereto. For example, a display element having a structure in which a plurality of display units are laminated may be used.

In the above-described embodiments, a line sequential driving (line sequential scanning) method is used as an example of the driving method, but the invention is not limited thereto. For example, a dot sequential driving method may be used as the driving method.

In the above-described embodiments, a three-layer liquid crystal display element including the B, G, and R display units 6b, 6g, and 6r is used as an example, but the invention is not limited thereto. For example, the invention may be applied to a two-layer liquid crystal display element or a four-or-more-layer liquid crystal display element.

In the above-described embodiments, the liquid crystal display element including the display units 6b, 6g, and 6r respectively provided with the liquid crystal layers 3b, 3g, and 3r that reflect blue, green, and red light in the planar state is used as an example, but the invention is not limited thereto. For example, the invention may be applied to a liquid crystal display element that includes three display units having liquid crystal layers that reflect cyan, magenta, and yellow light in the planar state.

In the above-described embodiments, a passive matrix liquid crystal display element is used as an example, but the invention is not limited thereto. For example, the invention may be applied to an active matrix liquid crystal display element in which a switching element, such as a thin film transistor (TFT) or a diode, is provided in each pixel. In addition, the invention is not limited to a liquid crystal display element using a matrix display method, such as a passive matrix driving method or an active matrix driving method, but the invention may be applied to a liquid crystal display element using a segment-type display method, such as a static driving method of applying a voltage to each desired segment to be displayed or a dynamic (multiplex) driving method of driving display segments in time series.

In the above-described embodiments, the liquid crystal display element in which the scanning electrodes 17b, 17g, and 17r are arranged in the row direction and the data electrodes 19b, 19g, and 19r are arranged in the column direction is used as an example, but the invention is not limited thereto. For example, the invention may be applied to a liquid crystal display element in which the scanning electrodes 17b, 17g, and 17r are arranged in the column direction and the data electrodes 19b, 19g, and 19r are arranged in the row direction. In this case, the liquid crystal display element can be driven by a line sequential driving method that the scanning electrodes 17b, 17g, and 17r are driven the column units and the image is displayed by sequentially driving the column units.

In the first and second embodiments, the scanning start position and the scanning direction of the G display unit 6g during line sequential scanning are different from those of the B and R display units 6b and 6r. This is because green light has the highest luminosity. However, the invention is not limited thereto, but the scanning start position and the scanning direction of the B display unit 6b or the R display unit 6r during line sequential scanning may be different from those of the other display units.

In the second embodiment, 4 frames form one image in order to perform grayscale display, but the invention is not limited thereto. During one frame period, the same scanning electrode 17 may be driven four times to perform Steps S2 to S5 on the pixels 12 on the scanning electrode 17. In this case, the one frame period is four times longer than that in the second embodiment, and it is possible for the observer to recognize the content of an image at the time corresponding to half the one frame period.

In the third embodiment, during line sequential scanning, the scanning start positions 38b, 38g, and 38r of the display units 6b, 6g, and 6r may deviate from each other by one-third of the display screen. Therefore, for example, scanning may be performed from the one hundred sixty-first scanning electrode 17r(161) in the R display unit 6r, scanning may be performed from the eighty-first scanning electrode 17g(81) in the G display unit 6g, and scanning may be performed from the first scanning electrode 17b(1) in the B display unit 6b.

What is claimed is:

1. A display element comprising:
a first display unit that includes a plurality of first pixels;
a second display unit that is laminated on the first display unit and includes a plurality of second pixels which are arranged so as to correspond to the plurality of first pixels; and
a driving unit that drives predetermined first pixels of the plurality of first pixels and predetermined second pixels other than the second pixels corresponding to the predetermined first pixels during image display substantially at the same time,
wherein the plurality of first pixels are arranged in a matrix, the plurality of second pixels are arranged in a matrix in correspondence with the plurality of first pixels, and
the driving unit performs a line sequential scanning operation that simultaneously drives the plurality of first and second pixels in a row or column unit and sequentially shifts the driven row or column to display an image,
wherein the first display unit includes a plurality of first scanning lines that are provided for the rows or columns of the pixels, the second display unit includes a plurality of second scanning lines that are provided for the rows or columns of the pixels in correspondence with the plurality of first scanning lines, and the driving unit includes a scanning line driving circuit that is commonly connected to predetermined first scanning lines of the plurality of first scanning lines and predetermined second scanning lines other than the second scanning lines corresponding to the predetermined first scanning lines, and wherein the scanning line driving circuit has a plurality of scanning electrode output terminals, the number of the plurality of scanning electrode output terminals is equal to each of the number of the plurality of first scanning lines and the number of the plurality of second scanning lines, and each of the plurality of scanning electrode output terminals is commonly connected to one of the plurality of first scanning lines and one of the plurality of second scanning lines.

2. The display element according to claim 1, wherein the driving unit performs the line sequential scanning operation on the first display unit and the second display unit at different scanning start positions.

3. The display element according to claim 1, wherein the driving unit performs the line sequential scanning operation on the first display unit and the second display unit in opposite scanning directions.

4. The display element according to claim 1, wherein the driving unit drives the plurality of first and second pixels plural times to perform multi-tone display.

5. The display element according to claim 1, wherein each of the first display unit and the second display unit includes a pair of substrates that are opposite to each other and liquid crystal that is sealed between the substrates.

6. The display element according to claim 5, wherein the liquid crystal is cholesteric liquid crystal.

7. The display element according to claim 5, further comprising:
a third display unit that is laminated on the first display unit and the second display unit and includes a plurality of third pixels which are arranged so as to correspond to the plurality of first and second pixels,
wherein the plurality of first to third pixels have a state that reflects light, a state that transmits light, and an intermediate state therebetween, and
the first display unit, the second display unit, and the third display unit reflect blue, green, and red light respectively.

8. The display element according to claim 7, wherein the first display unit reflects the blue light,
the second display unit reflects the green light,
the third display unit reflects the red light, and
the first display unit, the second display unit, and the third display unit are laminated from a display surface in this order.

9. The display element according to claim 8, wherein the optical rotatory power of the liquid crystal of the second display unit is different from the optical rotatory powers of the liquid crystals of the first and third display units.

10. The display element according to claim 8, further comprising:
a light absorbing layer that is provided on the lowermost layer on the opposite side of the display surface.

11. The display element according to claim 1, wherein each of the plurality of first and second pixels is a display segment of a segment display type.

12. An electronic paper comprising:
a display unit that displays a predetermined image and includes the display element according to claim 1.

* * * * *